United States Patent
Yano et al.

(10) Patent No.: US 7,852,441 B2
(45) Date of Patent: Dec. 14, 2010

(54) LIQUID CRYSTAL PANEL AND LIQUID CRYSTAL DISPLAY

(75) Inventors: Shuuji Yano, Ibaraki (JP); Kenji Yoda, Ibaraki (JP); Kentarou Kobayashi, Ibaraki (JP); Masatoshi Tomonaga, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 421 days.

(21) Appl. No.: 11/472,475

(22) Filed: Jun. 22, 2006

(65) Prior Publication Data
US 2007/0002233 A1   Jan. 4, 2007

(30) Foreign Application Priority Data

Jun. 30, 2005   (JP) .............................. 2005-192276
Apr. 21, 2006   (JP) .............................. 2006-118092

(51) Int. Cl.
*G02F 1/1333* (2006.01)
*G02F 1/1335* (2006.01)

(52) U.S. Cl. .................. 349/122; 349/96; 349/117; 349/119; 349/120

(58) Field of Classification Search ................. 349/120, 349/122
See application file for complete search history.

(56) References Cited

U.S. PATENT DOCUMENTS

| | | | | |
|---|---|---|---|---|
| 7,042,540 B2 * | 5/2006 | Yano et al. | ................... | 349/117 |
| 7,075,604 B2 * | 7/2006 | Yano et al. | ................... | 349/117 |
| 7,227,602 B2 * | 6/2007 | Jeon et al. | ................... | 349/119 |
| 7,474,374 B2 * | 1/2009 | Nagai et al. | ................... | 349/141 |
| 2002/0149726 A1 * | 10/2002 | Yano et al. | ................... | 349/117 |
| 2003/0210370 A1 * | 11/2003 | Yano et al. | ................... | 349/117 |
| 2004/0021814 A1 * | 2/2004 | Elman et al. | ................... | 349/117 |

(Continued)

FOREIGN PATENT DOCUMENTS

JP    10-307291 A    11/1998

(Continued)

OTHER PUBLICATIONS

Office Action dated Mar. 14, 2008 issued in corresponding Chinese Application No. 2006 10093225.1.

(Continued)

*Primary Examiner*—Brian M. Healy
*Assistant Examiner*—Paisley L Arendt
(74) *Attorney, Agent, or Firm*—Westerman, Hattori, Daniels & Adrian, LLP

(57) ABSTRACT

A liquid crystal panel of the present invention comprises at least: a liquid crystal cell comprising a liquid crystal layer containing a liquid crystal molecule that is oriented in homogeneous alignment with no electric field applied thereto; a first polarizer placed on one side of the liquid crystal cell; a first optical element placed between the liquid crystal cell and the first polarizer; and a second polarizer placed on the other side of the liquid crystal cell, wherein the first optical element is substantially optically isotropic, the liquid crystal cell has an initial alignment direction that is substantially parallel to the direction of an absorption axis of the first polarizer, and the absorption axis of the first polarizer is substantially perpendicular to an absorption axis of the second polarizer. The liquid crystal panel shows less discoloration of images even when the screen is viewed from oblique directions.

16 Claims, 6 Drawing Sheets

U.S. PATENT DOCUMENTS

2006/0098146 A1    5/2006  Yano

FOREIGN PATENT DOCUMENTS

| JP | 2005-97621 A | 4/2005 |
| JP | 2005-105139 A | 4/2005 |
| KR | 2005-0039587 A | 4/2005 |
| KR | 2005-0049137 A | 5/2005 |
| WO | 2005/015297 A1 | 2/2005 |
| WO | WO 2005/038517 A1 | 4/2005 |
| WO | WO 2005/050302 A1 | 6/2005 |

OTHER PUBLICATIONS

English Translation of the Office Action of Corresponding Korean Patent Application No. 10-2006-0051963 dated Jul. 27, 2007.

* cited by examiner (a)

(b)

(a)

(b)

(a)

(b)

LIQUID CRYSTAL PANEL AND LIQUID CRYSTAL DISPLAY

BACKGROUND OF THE INVENTION

1. Field of the Invention

The invention relates to a liquid crystal panel. The invention also relates to a liquid crystal television and a liquid crystal display each using the liquid crystal panel.

2. Description of the Related Art

In-Plane Switching (IPS) mode is currently one of the liquid crystal display driving modes widespread in television applications. In this driving mode, a nematic liquid crystal that has been oriented in homogeneous alignment with no electric field applied thereto is driven by in-plane electric field for image display. The IPS mode liquid crystal displays are characterized in that their viewing angle is wider than that of liquid crystal displays in other driving modes. However, the IPS mode has a problem in which a change in image color depending on viewing angle (also called color shift in oblique directions) is significant.

As a solution to the problem, there is disclosed an IPS mode liquid crystal display in which a polymer film (TAC layer) whose in-plane and thickness-direction retardations are small is used as a protective layer for a polarizer (see Japanese Patent Application Laid-Open (JP-A) No. 10-307291). In the conventional liquid crystal display, however, the color shift in oblique directions is not sufficiently overcome. Thus, it has been demanded to solve the problem.

SUMMARY OF THE INVENTION

The invention has been made to solve such a problem, and it is an object of the invention to provide a liquid crystal panel and display that show less discoloration of images even when the screen is viewed from oblique directions.

The inventors have made active investigations to solve the above problem and have finally found that the object can be achieved by means of the liquid crystal panel and display as described below so that the invention has been completed.

The present invention is related to a liquid crystal panel, comprising at least:

a liquid crystal cell comprising a liquid crystal layer containing a liquid crystal molecule that is oriented in homogeneous alignment with no electric field applied thereto;

a first polarizer placed on one side of the liquid crystal cell;

a first optical element placed between the liquid crystal cell and the first polarizer; and a second polarizer placed on the other side of the liquid crystal cell, wherein the first optical element is substantially optically isotropic, the liquid crystal cell has an initial alignment direction that is substantially parallel to the direction of an absorption axis of the first polarizer, and the absorption axis of the first polarizer is substantially perpendicular to an absorption axis of the second polarizer.

In preferable performance of the liquid crystal panel, the first optical element satisfies the formulae:

$$Re[590] \leq 10 \text{ nm} \quad (1) \text{ and}$$

$$|Rth[590]| \leq 10 \text{ nm} \quad (2)$$

wherein Re[590] and Rth[590] are an in-plane retardation and a thickness direction retardation, respectively, which are determined at 23° C. with respect to light having a wavelength of 590 nm.

In preferable performance of the liquid crystal panel, the first optical element comprises a polymer film that contains a cellulose resin or a norbornene resin.

In preferable performance of the liquid crystal panel, the first optical element comprises a first retardation film and a second retardation film, wherein
the first retardation film satisfies the formulae:

$$Re[590] \leq 10 \text{ nm} \quad (3) \text{ and}$$

$$10 \text{ nm} < Rth[590] \leq 200 \text{ nm} \quad (4), \text{ and}$$

the second retardation film satisfies the formulae:

$$Re[590] \leq 10 \text{ nm} \quad (5) \text{ and}$$

$$-200 \text{ nm} \leq Rth[590] < -10 \text{ nm} \quad (6),$$

wherein Re[590] and Rth[590] are an in-plane retardation and a thickness direction retardation, respectively, which are determined at 23° C. with respect to light having a wavelength of 590 nm.

In preferable performance of the liquid crystal panel, the second retardation film comprises a layer formed by solidifying or curing a composition that contains a homeotropically aligned liquid crystal compound.

In preferable performance of the liquid crystal panel, the first polarizer and the first optical element are placed on a viewer side of the liquid crystal cell. In this case, a polarizer is preferably placed on a backlight side of the liquid crystal cell such that an absorption axis of the polarizer is perpendicular to the initial alignment direction of the liquid crystal cell.

In preferable performance of the liquid crystal panel, the first polarizer and the first optical element are placed on a backlight side of the liquid crystal cell. In this case, a polarizer is preferably placed on a backlight side of the liquid crystal cell such that an absorption axis of the polarizer is parallel to the initial alignment direction of the liquid crystal cell.

In preferable performance of the liquid crystal panel, the liquid crystal panel further comprises a second optical element that satisfies the formulae:

$$Re[590] \leq 10 \text{ nm} \quad (7) \text{ and}$$

$$10 \text{ nm} < Rth[590] \leq 100 \text{ nm} \quad (8),$$

wherein Re[590] and Rth[590] are an in-plane retardation and a thickness direction retardation, respectively, which are determined at 23° C. with respect to light having a wavelength of 590 nm, between the liquid crystal cell and the second polarizer.

In preferable performance of the liquid crystal panel, the liquid crystal cell is in IPS mode, FFS mode or FLC mode.

The present invention also provides a liquid crystal television. This liquid crystal television comprises the above liquid crystal panel according.

The present invention also provides a liquid crystal display. This liquid crystal display comprises the above liquid crystal panel according.

The liquid crystal panel of the invention uses a first substantially optically-isotropic optical element in a specific positional relationship between a liquid crystal cell and a polarizer placed on one side of the liquid crystal cell, so that the amount of color shift in oblique directions can be significantly reduced without any other optical element than the first optical element placed between the liquid crystal cell and the first polarizer on the side where the first optical element is provided, as compared with the case of the conventional liquid crystal display. Particularly, when used in an O-mode configuration, the liquid crystal panel of the invention can significantly produce the effect. As stated above, the liquid crystal panel of the invention does not need to use any other optical element than the first optical element between the liquid crystal cell and the first polarizer and thus is suitable for forming a thin structure.

DESCRIPTION OF THE PREFERRED EMBODIMENTS (A. General Outline of the Liquid Crystal Panel)

Figure 1:
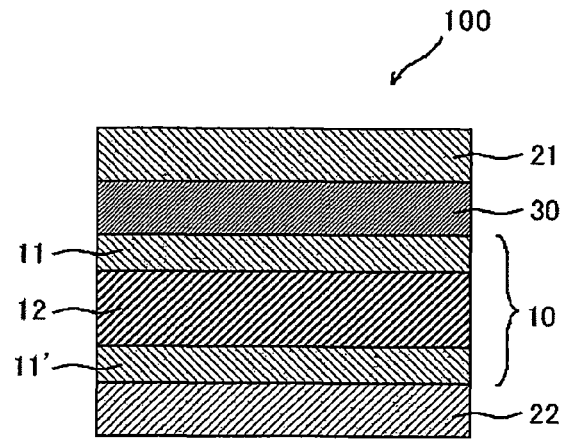
FIG. 1 is a schematic cross-sectional view of a liquid crystal panel according to a preferred embodiment of the invention.

FIG. 1 is a schematic cross-sectional view of a liquid crystal panel according to a preferred embodiment of the invention. FIG. 2(a) is a schematic perspective view showing a case where the liquid crystal panel employs E mode, and FIG. 2(b) is a schematic perspective view showing a case where the liquid crystal panel employs O mode. In FIGS. 2(a) and 2(b), the upper side is the viewer side, while the lower side is the backlight side. It should be noted that for ease of view, FIG. 1 and FIGS. 2(a) and 2(b) are depicted with a ratio different from the practical ratio between the length, width and thickness of each component. The liquid crystal panel 100 includes at least: a liquid crystal cell 10 including a liquid crystal layer containing a liquid crystal molecule that is oriented in homogeneous alignment with no electric field applied thereto; a first polarizer 21 placed on one side of the liquid crystal cell 10 (on the viewer side in FIG. 2(a); a first optical element 30 placed between the liquid crystal cell 10 and the first polarizer 21; and a second polarizer 22 placed on the other side of the liquid crystal cell 10 (on the backlight side in FIG. 2(a)). The first optical element 30 is substantially optically isotropic. The initial alignment direction of the liquid crystal cell 10 is substantially parallel to the direction of the absorption axis of the first polarizer 21. The absorption axis of the first polarizer 21 is substantially perpendicular to the absorption axis of the second polarizer 22. Practically, any appropriate protective layer (not shown) may be placed outside the first polarizer 21 or the second polarizer 22 (on the side opposite to the side where the liquid crystal cell is provided). A liquid crystal display including such a liquid crystal panel is characterized in that the amount of color shift in oblique directions is significantly small as compared with conventional liquid crystal displays.

The liquid crystal panel of the invention may be in the so-called E mode or in the so-called O mode. The term "E mode liquid crystal panel" refers to a liquid crystal panel in which the absorption axis of a polarizer placed on the backlight side of a liquid crystal cell is perpendicular to the initial alignment direction of the liquid crystal cell.

The term "O mode liquid crystal panel" refers to a liquid crystal panel in which the absorption axis of a polarizer placed on the backlight side of a liquid crystal cell is parallel to the initial alignment direction of the liquid crystal cell. In the E mode liquid crystal panel, as shown in FIG. 2(a), the first polarizer 21 and the first optical element 30 are preferably placed on the viewer side of the liquid crystal cell 10, and the second polarizer 22 is preferably placed on the backlight side of the liquid crystal cell 10. In the O mode liquid crystal panel, as shown in FIG. 2(b), the first polarizer 21 and the first optical element 30 are preferably placed on the backlight side of the liquid crystal cell 10, and the second polarizer 22 is preferably placed on the viewer side of the liquid crystal cell 10. In the invention, O mode is preferred, because it can more significantly reduce the amount of color shift in oblique directions for liquid crystal displays.

The liquid crystal panel of the invention is not limited to the above embodiment. For example, any component (such as a second optical element as described later in Section E) may be placed between the respective components as shown in FIG. 1. Each component and each layer of the liquid crystal panel of the invention are described in detail below.

(B. Liquid Crystal Cell)

Referring to FIG. 1, the liquid crystal cell 10 for use in the invention includes a pair of substrates 11 and 11' and a liquid crystal layer 12 serving as a display medium sandwiched between the substrates 11 and 11'. One substrate (active matrix substrate) 11' is provided with a switching element (typically TFT) for controlling the electro-optical properties of the liquid crystal, scanning lines for supplying gate signals to the active element, and signal lines for supplying source signals to the active element (all not shown). The other substrate (color filter substrate) 11 is provided with a color filter. Alternatively, the color filter may be placed on the active matrix substrate 11'. Alternatively, the color filter may be omitted, for example, in a field sequential system where a three-color (RGB) light source is used as a backlight for a liquid crystal display. The distance between the substrates 11 and 11' (cell gap) is controlled by means of spacers (not shown). An alignment film (not shown), which is for example made of polyimide, is provided on the side in contact with the liquid crystal layer 12 of the substrate 11 or 11'.

The liquid crystal layer 12 contains a liquid crystal molecule that oriented in homogeneous alignment with no electric field applied thereto. Such a liquid crystal layer (consequently a liquid crystal cell) typically exhibits a refractive index distribution according to $nx > ny = nz$ (wherein nx and ny are each an in-plane refractive index, and nz is a refractive index in the thickness direction). In the description, $ny = nz$ is intended to include not only the case that ny is completely equal to nz but also the case that ny is substantially equal to nz. The term "an initial alignment direction of a liquid crystal cell" refers to a direction in which the in-plane refractive index of a liquid crystal layer is maximum, which is produced as a result of alignment of a liquid crystal molecule contained in the liquid crystal layer with no electric field applied thereto. The initial alignment direction of the liquid crystal cell is preferably substantially parallel to the absorption axis of the first polarizer. As used herein, the term "substantially parallel" means that the angle between the initial alignment direction of the liquid crystal cell and the absorption axis of the first polarizer 21 is 0°±2°, preferably 0°±1°, more preferably 0°±0.5°.

Typical examples of the driving mode using a liquid crystal layer that exhibits the refractive index distribution according to nx>ny=nz include in-plane switching (IPS) mode, fringe field switching (FFS) mode, and ferroelectric liquid crystal (FLC) mode. Examples of the liquid crystal for use in such driving modes include nematic liquid crystals and smectic liquid crystals. For example, nematic liquid crystals are used in IPS or FFS mode, while smectic liquid crystals are used in FLC mode.

The IPS mode uses an electrically controlled birefringence (ECB) effect in which a nematic liquid crystal that has been oriented in homogeneous molecular alignment with no electric field applied thereto is allowed to respond in an electric field that is produced between a pixel electrode and a counter electrode made of metal and is parallel to the substrate (which is also called a in-plane electric field). More specifically, as described in "Monthly DISPLAY, July" published by Techno Times Co., Ltd., 1997, pp. 83-88 or "EKISHO, Vol. 2, No. 4" published by Japanese Liquid Crystal Society, 1998, pp. 303-316, for example, a normally black system includes: upper and lower polarizing plates arranged perpendicular to each other; and a liquid crystal cell whose alignment direction is coincident with the absorption axis of the polarizer on one side, in which black viewing is completely displayed under no electric field, while under a certain electric field, the liquid crystal molecule is rotated while remaining parallel to the substrate so that a transmittance can be obtained depending on the rotation angle. In the description, IPS mode is intended to include super in-plane switching (S-IPS) mode and advanced super in-plane switching (AS-IPS) mode, which employ a V-shaped electrode, a zigzag electrode, or the like. Examples of commercially available liquid crystal displays using the IPS mode include a 20V type wide liquid crystal television (trade name: Wooo, manufactured by Hitachi, Ltd.), a 19-inch liquid crystal display (trade name: ProLite E481S-1, manufactured by iiyama Corporation) and a 17-inch TFT liquid crystal display (trade name: FlexScan L565, manufactured by EIZO NANAO CORPORATION).

The FFS mode uses an electrically controlled birefringence (ECB) effect in which a nematic liquid crystal that has been oriented in homogeneous molecular alignment with no electric field applied thereto is allowed to respond in a parabolic electric field and an electric field, for example, which is produced between a pixel electrode and a counter electrode made of a transparent electrically-conductive material and is parallel to the substrate. Such electric fields in the FFS mode are also called fringe electric fields. The fringe electric field can be produced using a pixel electrode and a counter electrode made of a transparent electrically-conductive material, the distance between which is narrower than that between the upper and lower substrates. More specifically, as described in Society for Information Display (SID), 2001, Digest, pp. 484-487 or JP-A No. 2002-031812, for example, a normally black system includes: upper and lower polarizing plates arranged perpendicular to each other; and a liquid crystal cell whose alignment direction is coincident with the absorption axis of the polarizer on one side, in which black viewing is completely displayed under no electric field, while under a certain electric field, the liquid crystal molecule is rotated while remaining parallel to the substrate so that a transmittance can be obtained depending on the rotation angle. In the description, FFS mode is intended to include advanced fringe field switching (A-FFS) mode and ultra fringe field switching (U-FFS) mode, which employ a V-shaped electrode, a zigzag electrode, or the like. Examples of commercially available liquid crystal displays using the FFS mode include Tablet PC (trade name: M1400, manufactured by Motion Computing).

The FLC mode uses the properties of a ferroelectric chiral smectic liquid crystal that exhibits two stable molecular alignment states when sealed between electrode substrates each with a thickness of about 1 µm to 2 µm, in which the liquid crystal molecule is rotated in parallel to the substrate by voltage application so as to respond. In the FLC mode, black and white viewing can be displayed based on the same principles as the IPS or FFS mode. The FLC mode is characterized in that its response speed is faster than that of other driving modes. In the description, the FLC mode is intended to include surface stabilized FLC (SS-FLC) mode, anti-ferroelectric FLC (AFLC) mode, polymer stabilized FLC (PS-FLC) mode, and V-shaped property FLC (V-FLC) mode.

The liquid crystal molecule oriented in the homogeneous alignment refers to a liquid crystal molecule in such a state that the alignment vector of the liquid crystal molecule is oriented or aligned uniformly and parallel to the substrate plane as a result of the interaction between the oriented substrate and the liquid crystal molecule. In the description, "the homogeneous alignment" is also intended to include cases where the alignment vector of the liquid crystal molecule is slightly tilted relative to the substrate plane, namely cases where the liquid crystal molecule has a pre-tilt. When the liquid crystal molecule has a pre-tilt, the pre-tilt angle is preferably 10° or less, in terms of keeping the contrast ration high and producing good display properties.

The nematic liquid crystal may be any appropriate nematic liquid crystal depending on purpose. For example, the nematic liquid crystal may have positive or negative dielectric anisotropy. The nematic liquid crystal with positive dielectric anisotropy may specifically be ZLI-4535 (trade name) manufactured by Merck. The nematic liquid crystal with negative dielectric anisotropy may specifically be ZLI-2806 (trade name) manufactured by Merck. The difference between the ordinary refractive index (no) and the extraordinary refractive index (ne) of the nematic liquid crystal, namely the birefringence ($\Delta n_{LC}$), may be appropriately selected depending on the response speed, transmittance or the like of the liquid crystal. The $\Delta n_{LC}$ is generally from 0.05 to 0.30.

The smectic liquid crystal may be any appropriate smectic liquid crystal depending on purpose. Preferably, the smectic liquid crystal has an asymmetric carbon atom in part of its molecular structure and exhibits ferroelectricity (which is also called a ferroelectric liquid crystal). Examples of the ferroelectric smectic liquid crystal include p-desiloxybenzylidene-p'-amino-2-methylbutyl cinnamate, p-hexyloxybenzylidene-p'-amino-2-chloropropyl cinnamate, and 4-o-(2-methyl)-butylresorcilidene-4'-octylaniline. Any commercially available ferroelectric liquid crystal may also be used as it is. Examples of the commercially available ferroelectric liquid crystal include ZLI-5014-000 (trade name, 2.88 nF in electric capacity, −2.8 C/cm$^2$ in spontaneous polarization, manufactured by Merck), ZLI-5014-100 (trade name, 3.19 nF in electric capacity, −20 C/cm$^2$ in spontaneous polarization, manufactured by Merck), and FELIX-008 (trade name, 2.26 nF in electric capacity, −9.6 C/cm$^2$ in spontaneous polarization, manufactured by Hoechst).

The liquid crystal cell may have any appropriate cell gap (distance between the substrates) depending on purpose. The cell gap is preferably from 1 μm to 7 μm. Within the above range, the response time can be reduced, and good display properties can be obtained.

(C. Polarizer)

In the description, the polarizer refers to an element capable of converting natural light, polarized light or the like into any polarized light. Any appropriate polarizer may be used in the invention. The polarizer preferably converts natural light or polarized light into linearly polarized light. Such a polarizer may have the function of allowing one polarized light component to pass through when incident light is divided into two perpendicular polarized light components and may also have at least one function selected from the functions of absorbing, reflecting and scattering the other polarized light component.

The polarizer may have any appropriate thickness. The thickness of the polarizer is typically from 5 μm to 80 μm, preferably from 10 μm to 50 μm, more preferably from 20 μm to 40 μm. Within the above range, products with good optical properties or high mechanical strength can be obtained.

(C-1. Optical Properties of Polarizer)

The transmittance of the polarizer measured at 23° C. with respect to a wavelength of 550 nm (also called single-piece transmittance) is preferably at least 41%, more preferably at least 43%. The theoretical upper limit of the single transmittance is 50%, while the achievable upper limit is 46%. The degree of polarization is preferably at least 99.8%, more preferably at least 99.9%. The theoretical upper limit of the degree of polarization is 100%. Within the above range, the panel used in a liquid crystal display can produce a high contrast ratio in the front direction.

According to National Bureau of Standards (NBS), the hue a value (single-piece a value) of the polarizer for use in the invention is preferably not less than −2 and less than 0, more preferably not less than −1.8 and less than 0. According to National Bureau of Standards (NBS), the hue b value (single-piece b value) of the polarizer is preferably more than 0 and not more than 3.8, more preferably more than 0 and not more than 3.5.

The single-piece transmittance, degree of polarization and hue may be measured using a spectrophotometer (DOT-3 (trade name) manufactured by Murakami Color Research Laboratory). A specific method for measuring the degree of polarization includes measuring the parallel transmittance ($H_0$) and perpendicular transmittance ($H_{90}$) of the polarizer and calculating the degree of polarization according to the formula: Degree of polarization(%)={$(H_0-H_{90})/(H_0+H_{90})$}$^{1/2}$×100. The parallel transmittance ($H_0$) is the transmittance value of a set of polarizers stacked in parallel that is prepared by stacking the same two polarizers in such a manner that their absorption axes are parallel to each other. The perpendicular transmittance ($H_{90}$) is the transmittance value of a set of perpendicularly stacked polarizers that is prepared by stacking the same two polarizers in such a manner that their absorption axes are perpendicular to each other. These transmittances are Y values that have been corrected for luminosity by a two-degree visual technique (with a C light source) according to JIS Z 8701 (1982).

(C-2. Method for Placing Polarizers)

Referring to FIGS. 1(a) and 1(b), any appropriate method may be used depending on purpose in order to place the first and second polarizers 21 and 22. Preferably, the first polarizer 21 is attached to the surface of the first optical element 30 through a bonding layer (not shown) provided on the surface opposite to the liquid crystal cell 10. Preferably, the second polarizer 22 is attached to the surface of the liquid crystal cell 10 through a bonding layer (not shown) provided on the surface opposite to the liquid crystal cell 10. If any other optical element is placed between the liquid crystal cell 10 and the second polarizer 22, the second polarizer 22 may be attached to the surface of the any other optical element.

If the polarizer is attached in this way in the process of incorporating it into a liquid crystal display, the absorption axis of the polarizer can be prevented from deviating from the specific position, or the polarizer and each adjacent optical element can be prevented from rubbing against each other and being damaged. In addition, the adverse effect of a reflection or refraction generated at the interface between the layers of the polarizer and each adjacent optical element can be reduced, and the contrast ratio in the front and oblique directions can be increased. In the description, the "bonding layer" is not particularly limited, as long as it can bond the surfaces of adjacent optical elements and polarizers with such adhesive strength and time that do not practically produce an adverse effect and can integrate them. Examples of the bonding layer include an adhesive layer and an anchor coat layer. The bonding layer may be a multilayer structure, for example, including an anchor coat layer formed on the surface of the adherend and an adhesive layer formed thereon.

The first polarizer 21 is placed such that its absorption axis is substantially perpendicular to the absorption axis of the opposite second polarizer 22. As used herein, the term "substantially perpendicular" is intended to include cases where the angle between the absorption axes of the first and second polarizers 21 and 22 is 90°±2°, preferably 90°±1°, more preferably 90°±0.5°.

The thickness of the bonding layer may be appropriately determined depending on intended purpose, adhesive strength or the like. The thickness of the bonding layer is preferably from 0.1 μm to 100 μm, more preferably from 0.5 μm to 50 μm. Within the above range, the bonded optical element or polarizer can be prevented from separating or flaking so that adhesive strength and time with no practically adverse effect can be obtained.

An appropriate adhesive or anchor coat agent may properly be selected as the material for forming the bonding layer, depending on the type of the adherend or purpose. Examples of the adhesive include solvent-type adhesives, emulsion-type adhesives, pressure-sensitive adhesives, re-wettable adhesives, condensation polymerization type adhesives, solventless adhesives, film-shaped adhesives, and hot melt adhesives, according to classification by form. Examples of the adhesive also include synthetic resin adhesives, rubber-based adhesives, and natural adhesives, according to classification by chemical structure. The adhesive is intended to include viscoelastic substances showing a pressure-contact-sensitive adhesive strength at room temperature (also called pressure-sensitive adhesives).

When a polymer film mainly composed of a polyvinyl alcohol type resin is used for the polarizer, the material for forming the bonding layer is preferably a water-soluble adhesive. For example, the water-soluble adhesive is mainly composed of a polyvinyl alcohol type resin. A commercially available adhesive may be used, as it is, for the bonding layer. Alternatively, a mixture of a commercially available adhesive and a solvent or an additive may be used. For example, the commercially available adhesive mainly composed of a polyvinyl type alcohol resin includes Gosefimer Z200 (trade name) manufactured by The Nippon Synthetic Chemical Industry Co., Ltd.

The water-soluble adhesive may further contain a crosslinking agent. Examples of the type of the crosslinking agent preferably include amine compounds, aldehyde compounds, methylol compounds, epoxy compounds, isocyanate compounds, and multivalent metal salts. A commercially available crosslinking agent may be used as it is. Examples of the commercially available crosslinking agent include an amine compound manufactured by Mitsubishi Gas Chemical Company, Inc. (trade name: Methaxylenediamine), an aldehyde compound manufactured by The Nippon Synthetic Chemical Industry Co., Ltd. (trade name: Glyoxal) and a methylol compound manufactured by Dainippon Ink and Chemicals, Incorporated (trade name: Watersol).

(C-3. Optical Films for Use in Polarizer)

The optical film for use in the polarizer may be selected from any appropriate polarizing films. For example, the polarizer may be made of a stretched polymer film mainly composed of a polyvinyl alcohol type resin that contains iodine or a dichroic dye. Alternatively, the polarizer may be an O-type polarizer in which a liquid crystalline composition containing a dichroic substance and a liquid crystalline compound is oriented in a certain direction as disclosed in U.S. Pat. No. 5,523,863 or may be an E-type polarizer in which a lyotropic liquid crystal is oriented in a certain direction as disclosed in U.S. Pat. No. 6,049,428.

Preferably, the polarizer is a stretched polymer film mainly composed of a polyvinyl alcohol type resin containing iodine or a dichroic dye, because such a polarizer can produce a high degree of polarization and a high contrast ratio in the front direction of a liquid crystal display. For example, the polymer film mainly composed of the polyvinyl alcohol type resin is produced by the method described in Example 1 of JP-A No. 2000-315144. A commercially available polymer film may be stretched and used. Examples of the commercially available polymer film include Kuraray Vinylon Film (trade name) manufactured by KURARAY CO., LTD., Tohcello Vinylon Film (trade name) manufactured by TOHCELLO CO., LTD, and Nichigo Vinylon Film (trade name) manufactured by The Nippon Synthetic Chemical Industry Co., Ltd.

The polyvinyl alcohol type resin may be a product that is prepared by saponifying a vinylester polymer prepared by polymerization of a vinylester monomer for the purpose of converting the vinylester unit into a vinyl alcohol unit. Examples of the vinylester monomer include vinyl formate, vinyl acetate, vinyl propionate, vinyl valerinate, vinyl laurate, vinyl stearate, vinyl benzoate, vinyl pivalate, and vinyl versatate.

The polyvinyl alcohol type resin may have any appropriate average degree of polymerization. The average degree of polymerization of the polyvinyl alcohol type resin is preferably from 1200 to 3600, more preferably from 1600 to 3200, most preferably from 1800 to 3000. The average degree of polymerization may be measured by the method according to JIS K 6726 (1994).

In view of the durability of the polarizer, the saponification degree of the polyvinyl alcohol type resin is preferably from 90% by mole to 99.9% by mole, more preferably from 95% by mole to 99.9% by mole, most preferably from 98% by mole to 99.9% by mole. The saponification degree indicates the ratio of the unit actually saponified into the vinyl alcohol unit to the unit convertible into the vinyl alcohol unit by saponification. The saponification degree of the polyvinyl alcohol type resin may be determined according to JIS K 6726 (1994).

The polymer film mainly composed of the polyvinyl alcohol type resin for use in the invention preferably contains a plasticizer of a polyhydric alcohol. Examples of the polyhydric alcohol include ethylene glycol, glycerol, propylene glycol, diethylene glycol, triethylene glycol, tetraethylene glycol, and trimethylolpropane. Any of these materials may be used alone, or two or more of these materials may be used in combination. In the invention, ethylene glycol or glycerol is preferably used in view of stretchability, transparency, thermal stability, or the like.

In the invention, the content (weight ratio) of the polyhydric alcohol is preferably from 1 to 30 parts by weight, more preferably from 3 to 25 parts by weight, most preferably from 5 to 20 parts by weight, based on 100 parts by weight of the total solid of the polyvinyl alcohol type resin. Within the above range, dye-affinity, stretchability, or the like can further be improved.

The polymer film mainly composed of the polyvinyl alcohol type resin may also contain a surfactant. The surfactant is used to improve dye-affinity, stretchability or the like.

The surfactant may be of any appropriate type. It may be an anionic surfactant, a cationic surfactant, or a nonionic surfactant. In the invention, a nonionic surfactant is preferably used. Examples of the nonionic surfactant include lauric acid diethanolamide, coconut oil fatty acid diethanolamide, coconut oil fatty acid monoethanolamide, lauric acid monoisopropanolamide, and oleic acid monoisopropanolamide.

The content (weight ratio) of the surfactant is preferably more than 0 and not more than 5 parts by weight, more preferably more than 0 to not more than 3 part by weight, most preferably more than 0 and not more than 1 part by weight, based on 100 parts by weight of the polyvinyl alcohol type resin. Within the above range, dye-affinity or stretchability can be improved.

The dichroic substance may be any appropriate dichroic substance. Specific examples thereof include iodine and dichroic dyes. As used herein, the term "dichroic" refers to optical anisotropy in which two directions: the optic axis direction and the direction perpendicular thereto are different in absorption of light.

Examples of the dichroic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

Figure 3:
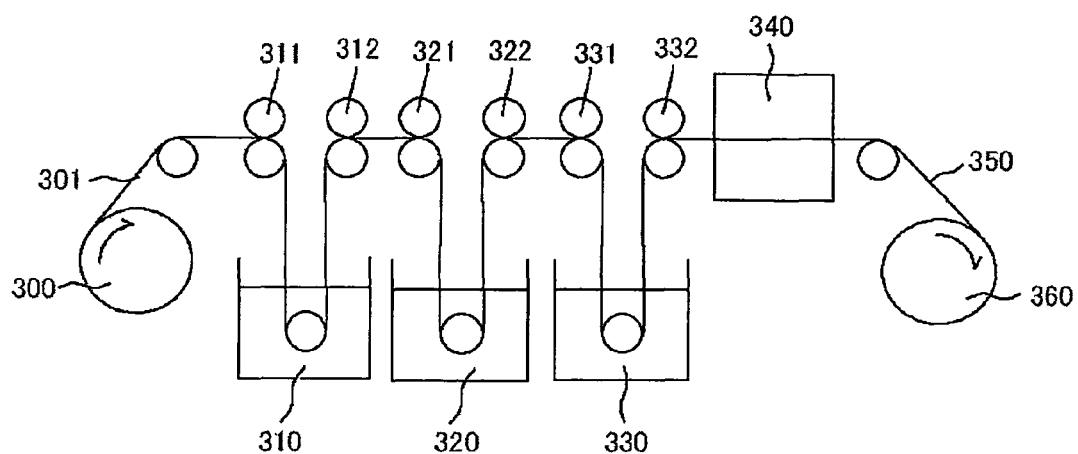
FIG. 3 is a schematic diagram showing the concepts of a typical process for manufacturing a polarizer for use in the invention.

An example of the method for preparing the polarizer is described with reference to FIG. 3, which is a schematic diagram showing a concept of a typical process for preparing the polarizer for use in the invention. For example, a polymer film 301 mainly composed of a polyvinyl alcohol type resin is fed from a supply unit 300, dipped into an aqueous iodine solution bath 310, and subjected to swelling and dyeing processes while tension in the longitudinal direction of the film is applied to the film from rolls 311 and 312 different in velocity ratio. The film is then dipped into a bath 320 of an aqueous solution containing boric acid and potassium iodide, and subjected to crosslinking treatment while tension in the longitudinal direction of the film is applied to the film from rolls 321 and 322 different in velocity ratio. The crosslinked film is dipped into an aqueous potassium iodide-containing solution bath 330 through rolls 331 and 332 and subjected to washing with water. The water-washed film is dried by drying means 340 so as to have an adjusted moisture percentage and then wound up on a take-up unit 360. After these processes, a polarizer 350 is obtained by stretching the polymer film mainly composed of the polyvinyl alcohol type resin to five to seven times its original length The polarizer 350 may have any appropriate moisture percentage. The moisture percentage is preferably from 5% to 40%, more preferably from 10% to 30%, most preferably from 20% to 30%.

(D. First Optical Element)

Figure 2:
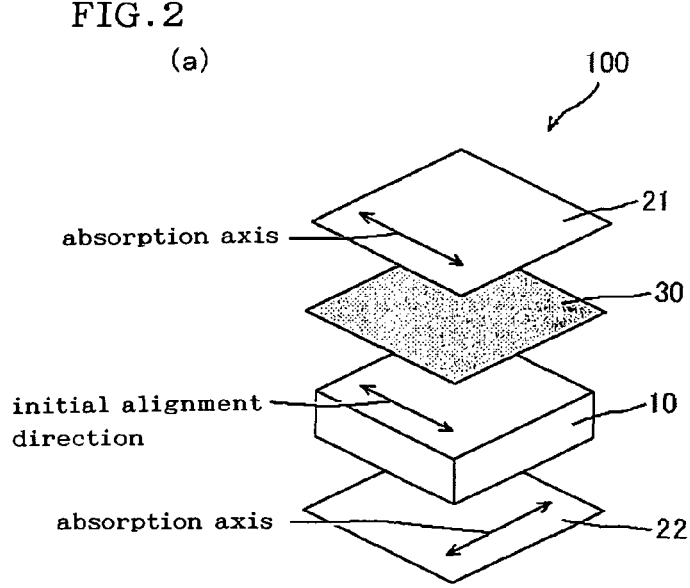
FIG. 2(a) is a schematic perspective view showing a case where the liquid crystal panel of FIG. 1 uses E mode.
FIG. 2(b) is a schematic perspective view showing a case where the liquid crystal panel of FIG. 1 uses O mode.
Figure 2:
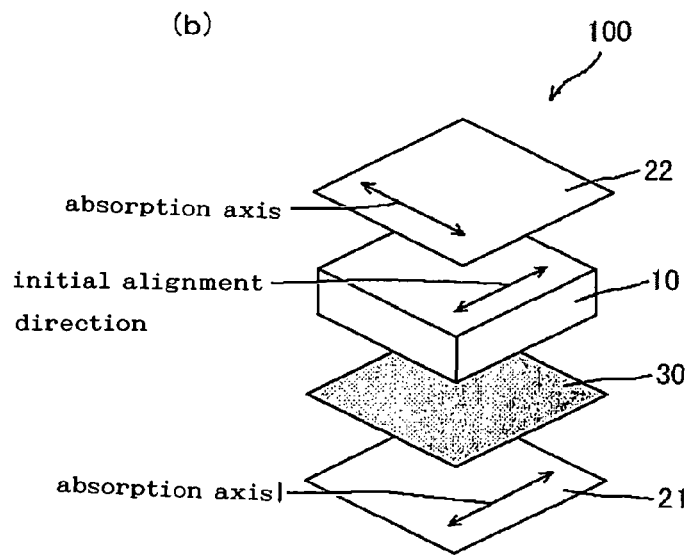

Referring to FIG. 1 and FIGS. 2(*a*) and 2(*b*), the first optical element 30 is placed between the liquid crystal cell 10 and the first polarizer 21. According to this configuration, the first optical element functions as a protective layer on the liquid crystal cell side of the polarizer to prevent degradation of the polarizer so that the display properties of the liquid crystal display can be maintained at high level for a long time. The first optical element 30 is substantially optically-isotropic (or has substantially optically-isotropic properties). As used herein, the term "substantially optically-isotropic (or substantially optically-isotropic properties)" means that the retardation of the optical element is so small that it does not substantially affect the optical properties of the liquid crystal panel.

The first optical element 2 used in the invention preferably satisfies the formulae:

$$Re[590] \leq 10 \text{ nm} \quad (1)$$

and $$|Rth[590]| \leq 10 \text{ nm} \quad (2)$$

wherein Re[590] and Rth[590] are an in-plane retardation and a thickness direction retardation, respectively, which are determined at 23° C. with respect to light having a wavelength of 590 nm.

(D-1. Optical Properties of First Optical Element)

In the description, Re[590] represents an in-plane retardation that is determined at 23° C. with respect to light having a wavelength of 590 nm. As used herein, the term "in-plane retardation" means the in-plane retardation of a retardation film in a case where the optical element consists of a single piece of the retardation film or means the in-plane retardation of the whole of a laminate in a case where the optical element consists of a laminate that contains a retardation film. Re[590] may be calculated according to the formula: Re[590]=(nx−ny)d, wherein nx is the refractive index of the optical element in the slow axis direction at a wavelength of 590 nm, ny is the refractive index of the optical element in the fast axis direction at a wavelength of 590 nm, and d (nm) is the thickness of the optical element. The slow axis is a direction in which the in-plane refractive index is maximal.

The Re[590] of the first optical element is preferably from 0 nm to 10 nm, more preferably from 0 nm to 6 nm, particularly preferably from 0 nm to 4 nm, most preferably from 0 nm to 2 nm. If the Re[590] is set within the above range, a liquid crystal display can be obtained that can make the amount of light leakage in oblique directions small and can display clear images.

In the description, Rth[590] represents a thickness-direction retardation (a retardation in the thickness direction) that is determined at 23° C. with respect to light having a wavelength of 590 nm. Rth[590] may be calculated according to the formula: Rth[590]=(nx−nz)d, wherein nx is the refractive index of the optical element in the slow axis direction at a wavelength of 590 nm, nz is the refractive index of the optical element in its thickness direction at a wavelength of 590 nm, and d (nm) is the thickness of the optical element. The slow axis is a direction in which the in-plane refractive index is maximal.

The absolute value of Rth[590] of the first optical element (|Rth[590]|) is preferably at most 10 nm, more preferably at most 8 nm, particularly preferably at most 6 nm, most preferably at most 4 nm. If the absolute value of the Rth[590] is set within the above range, a liquid crystal display can be obtained that can make the amount of light leakage in oblique directions small and can display clear images.

Re[590] and Rth[590] may also be determined using KOBRA21-ADH (trade name) manufactured by Oji Scientific Instruments. From the formulae (i) to (iv) below, nx, ny and nz may be obtained by computer numerical calculation using the in-plane retardation (Re) at 23° C. and a wavelength of 590 nm, a retardation (R40) that is measured when the slow axis is used as an axis of tilt and inclined 40°, the thickness (d) of the optical element, and the average refractive index (n0) of the optical element. Then, Rth may be calculated from the formula (iv) below. In the calculation, φ and ny' are represented by the formulae (v) and (vi) below, respectively.

$$Re=(nx-ny)d \quad (i)$$

$$R40=(nx-ny')d/\cos(\phi) \quad (ii)$$

$$(nx+ny+nz)/3=n0 \quad (iii)$$

$$Rth=(nx-nz)d \quad (iv)$$

$$\phi=\sin^{-1}[\sin(40°)/n0] \quad (v)$$

$$ny'=ny \cdot nz/[ny^2 \cdot \sin^2(\phi)+nz^2 \cdot \cos^2(\phi)]^{1/2} \quad (vi)$$

(D-2. Means for Placing First Optical Element)

Referring to FIG. 1, any appropriate method may be used depending on purpose in order to place the first optical element 30. Preferably, the first optical element 30 is attached to the first polarizer 21 and the liquid crystal cell 10 through a bonding layer (not shown) provided on its surface. If the gap between the respective optical elements is filled with the bonding layer in this way, the relationship between the optical axes of the respective optical elements can be prevented from fluctuating, or the respective optical elements can be prevented from rubbing against each other and being damaged. In addition, the adverse effect of a reflection or refraction generated at the interface between the layers of the respective optical elements can be reduced so that a liquid crystal display capable of displaying clear images can be obtained.

The first optical element 30 is substantially optically-isotropic. In some cases, however, a slow axis can be detected from it in a practical range. In such cases, the first optical element 30 is preferably placed such that its slow axis is substantially parallel or perpendicular to the absorption axis of the adjacent first polarizer 21. Preferably, the first optical element 30 is placed such that its slow axis is substantially parallel to the absorption axis of the adjacent first polarizer 21, because such placement allows roll preparation and easy lamination so that the production efficiency can be significantly improved. As used herein, the term "substantially parallel" is intended to include cases where the angle between the slow axis of the first optical element 30 and the absorption axis of the first polarizer 21 is 0°±2°, preferably 0°±1°, more preferably 0°±0.5°. The term "substantially perpendicular" is intended to include cases where the angle between the slow axis of the first optical element 30 and the absorption axis of the first polarizer 21 is 90°±2°, preferably 90°±1°, more preferably 90°±0.5°.

The thickness of the bonding layer may be appropriately determined depending on intended purpose, adhesive strength or the like. The thickness of the bonding layer is preferably from 0.1 µm to 100 µm, more preferably from 0.5 µm to 50 µm. Within the above range, the bonded optical element or polarizer can be prevented from separating or flaking so that adhesive strength and time with no practically adverse effect can be obtained.

Any appropriate material may be properly selected from the materials illustrated in Section C-2 in order to form the bonding layer. A pressure-sensitive adhesive using an acrylic polymer as a base polymer (also referred to as pressure-sensitive acrylic adhesive) is preferably used, because it can exhibit good optical transparency, moderate wettability or cohesiveness and adhesive properties, and high weather resistance or heat resistance. A commercially available optical double-side tape may be used, as it is, for the bonding layer. For example, the commercially available optical double-side tape includes SK-2057 (trade name) manufactured by Soken Chemical & Engineering Co., Ltd.

(D-3. Composition of First Optical Element)

The composition (layered structure) of the first optical element for use in the invention is not particularly limited, as long as it satisfies the optical properties as described above in Section D-1. Specifically, the first optical element may be a polymer film that is substantially optically-isotropic or may be a laminate composed of two or more retardation films. Preferably, the first optical element is a single polymer film that is substantially optically-isotropic, because it can produce high display uniformity and form a thin liquid crystal panel. If the first optical element is a laminate, it may include a bonding layer. Different retardation films with different properties are preferably used to form the laminate including two or more retardation films. The substantially optically-isotropic polymer film and the retardation film are described in detail later in Section D-4.

When a retardation film is used for the first optical element, the Re[590] and Rth[590] may be appropriately selected depending on the number of the retardation films for use. For example, when the first optical element is formed as a laminate including two or more retardation films, it is preferably designed such that the total of Re[590] or Rth[590] of the respective retardation films is equal to the Re[590] or Rth[590] of the first optical element, respectively. In order to form the first optical element, for example, two retardation films: a retardation film with an Re[590] of 10 nm and an Rth[590] of 60 nm and a retardation film with an Re[590] of 10 nm and an Rth[590] of −60 nm may be laminated such that the respective slow axes are perpendicular to each other. The Re[590] of the optical element can be reduced by placing two retardation films in such a manner that the respective slow axes are perpendicular to each other. While only the cases of at most two retardation films are illustrated, it will be understood that the invention is applicable to any laminate including three or more retardation films.

While the thickness of the first optical element may vary with its composition, it is preferably from 10 µm to 200 µm, more preferably from 20 µm to 200 µm, particularly preferably from 30 µm to 150 µm, most preferably from 30 µm to 100 µm. Within the above range, optical elements with high optical uniformity can be obtained.

(D-4. Optical Film for Use in First Optical Element)

Any appropriate optical film may be used for the first optical element. The optical film preferably has high transparency, high mechanical strength, high thermal stability, high water-blocking properties, or the like.

The thickness of the optical film may vary with the number of the layers to be laminated. Typically, the first optical element is preferably designed to have a total thickness of 10 µm to 200 µm. In a case where the first optical element is made of a single polymer film having substantially optically-isotropic properties, for example, the film preferably has a thickness of 10 µm to 200 µm (namely a thickness equal to the total thickness of the first optical element). In a case where the first optical element is a laminate of two retardation films, for example, each retardation film may have any thickness, as long as the total of the thicknesses becomes a preferred thickness for the whole of the first optical element. Accordingly, the respective retardation films may have the same thickness or different thicknesses. In an embodiment where two retardation films are laminated, one of the retardation films preferably has a thickness of 5 µm to 100 µm.

The absolute value (C[590] (m$^2$/N) of the photoelastic coefficient of the optical film is preferably from $1\times10^{-12}$ to $100\times10^{-12}$, more preferably from $1\times10^{-12}$ to $60\times10^{-12}$, particularly preferably from $1\times10^{-12}$ to $30\times10^{-12}$. If a material having an absolute photoelastic coefficient value in the above range is used for the optical film, liquid crystal displays with high display uniformity can be obtained.

The transmittance of the optical film determined at 23° C. with respect to light having a wavelength of 590 nm is preferably at least 80%, more preferably at least 85%, particularly preferably at least 90%. The first optical element also preferably has the same light transmittance. The transmittance has a theoretical upper limit of 100% and an achievable upper limit of 96%.

When the first optical element for use in the invention is made of a single substantially optically-isotropic polymer film, the first optical element preferably includes a polymer film that contains a thermoplastic resin. The thermoplastic resin may be an amorphous polymer or a crystalline polymer. The amorphous polymer has the advantage of high transparency, while the crystalline polymer has the advantage of high stiffness, strength or chemical resistance. The thermoplastic resin-containing polymer film may be stretched or unstretched.

Examples of the thermoplastic resin include general-purpose plastics such as acrylic resins, polyolefin resins, cycloolefin resins, polyvinyl chloride resins, cellulose resins, styrene resins, acrylonitrile-butadiene-styrene resins, acrylonitrile-styrene resins, poly(methyl methacrylate), polyvinyl acetate, and polyvinylidene chloride resins; general-purpose engineering plastics such as polyamide resins, polyacetal resins, polycarbonate resins, modified polyphenylene ether resins, polybutylene terephthalate resins, and polyethylene terephthalate resins; and super engineering plastics such as polyphenylene sulfide resins, polysulfone resins, polyethersulfone resins, polyetherether ketone resins, polyarylate resins, liquid crystalline resins, polyamideimide resins, polyimide resins, and polytetrafluoroethylene resins. Any of these thermoplastic resins may be used alone, or two or more of these thermoplastic resins may be used in combination. Any of these thermoplastic resins may be subjected to any appropriate polymer-modification before use. Examples of the polymer-modification include copolymerization, crosslinking, and modification of molecular ends, stereoregularity, or the like.

The first optical element for use in the invention preferably includes a polymer film that contains an acrylic resin, a norbornene resin or a cellulose resin. In particular, the first optical element is preferably a polymer film that contains a norbornene resin or a cellulose resin, because such a resin can form a polymer film whose Re[590] and Rth[590] are small.

For example, the polymer film mainly composed of the acrylic resin may be prepared by the method described in Example 1 of JP-A No. 2004-198952.

As used herein, the term "norbornene resin" refers to polymers that are produced using a norbornene monomer with a norbornene ring as part or all of the starting material(s) (monomer(s)). While the norbornene resin is produced with a starting material having a norbornene ring (a double-bond-containing norbornane ring), it may have or may not have a norbornane ring unit in the (co)polymer structure. Examples of the norbornene resin having no norbornane ring unit in the (co)polymer structure include polymers of a monomer that is converted into a five-membered ring by cleavage, such as polymers of norbornene, dicyclopentadiene, 5-phenylnorbornene, or any derivative thereof. In the norbornene resin of a copolymer, the ordered state of its molecule is not particularly limited, and the norbornene resin may be a random copolymer, a block copolymer, or a graft copolymer.

A commercially available product may be used as the norbornene resin without being processed. Alternatively, a commercially available norbornene resin may be subjected to any appropriate polymer-modification before use. Examples of commercially available norbornene resins include ARTON series manufactured by JSR Corporation (trade names: ARTON FLZR50, ARTON FLZR70, ARTON FLZL100, ARTON F5023, ARTON FX4726, ARTON FX4727, ARTON D4531, and ARTON D4532), ZEONOR series manufactured by Nippon Zeon Co., Ltd. (trade names: ZEONOR 750R, ZEONOR 1020R, and ZEONOR 1600), APL series manufactured by Mitsui Chemicals, Inc. (APL8008T, APL6509T, APL6011T, APL6013T, APL6015T, and APL5014T), and COC resin (trade name: TOPAS) manufactured by TICONA.

Examples of the norbornene resin include (A) a resin of a hydrogenated ring-opened (co)polymer of a norbornene monomer and (B) a resin of an addition polymer of a norbornene monomer. The ring-opened copolymer of the norbornene monomer is intended to include a resin of a hydrogenated ring-opened copolymer of at least one norbornene monomer, and an α-olefin, a cycloalkene, and/or a non-conjugated diene. The resin of the addition copolymer of the norbornene monomer is intended to include a resin of an addition copolymer of at least one norbornene monomer, and an α-olefin, a cycloalkene, and/or a non-conjugated diene.

The resin of the hydrogenated ring-opened (co)polymer of the norbornene monomer may prepared by a process including the steps of subjecting the norbornene monomer or the like to a metathesis reaction to form a ring-opened (co)polymer and then hydrogenating the ring-opened (co)polymer. Examples of such a process include the method described in "Development and Application Techniques of Optical Polymer Materials," published by NTS INC., 2003, pp. 103-111, and the methods described in paragraphs [0059] to [0060] of JP-A No. 11-116780, paragraphs [0035] to [0037] of JP-A No. 2001-350017, and paragraph [0053] of JP-A No. 2005-008698. The resin of the addition polymer of the norbornene monomer may be prepared by the method described in Example 1 of JP-A No. 61-292601.

The weight average molecular weight (Mw) of the norbornene resin is preferably from 20,000 to 400,000, more preferably from 25,000 to 200,000, particularly preferably from 30,000 to 100,000, most preferably from 40,000 to 80,000, in terms of the value measured by gel permeation chromatography (GPC) with a solvent of tetrahydrofuran. With a weight average molecular weight in the above range, products with high mechanical strength and good solubility or formability or good casting or extruding operability can be produced.

Any appropriate cellulose resins may be used. The cellulose resin is preferably an ester of cellulose with an organic acid or an ester of cellulose with mixed organic acids, in which part or all of the hydroxyl groups of the cellulose are replaced with acetyl, propionyl, and/or butyl. Examples of the ester of cellulose with the organic acid or with the mixed organic acids include cellulose acetate, cellulose propionate, cellulose butyrate, cellulose acetate propionate, and cellulose acetate butyrate. The above cellulose resins may be prepared by the method described in paragraphs [0040] to [0041] of JP-A No. 2001-188128.

A commercially available product may be used as the cellulose resin without being processed. Alternatively, a commercially available cellulose resin may be subjected to any appropriate polymer-modification before use. Examples of the polymer-modification include copolymerization, crosslinking, and modification of molecular ends, stereoregularity, or the like. Examples of the commercially available cellulose resin include cellulose acetate propionate resins manufactured by DAICEL FINECHEM LTD. (trade names: 307E-09, 360A-09 and 360E-16), cellulose acetate manufactured by EASTMAN (trade names: CA-398-30, CA-398-30L, CA-320S, CA-394-60S, CA-398-10, CA-398-3, CA-398-30, and CA-398-6), cellulose butyrate manufactured by EASTMAN (trade names: CAB-381-0.1, CAB-381-20, CAB-500-5, CAB-531-1, CAB-551-0.2, and CAB-553-0.4), and cellulose acetate propionate manufactured by EASTMAN (trade names: CAP-482-0.5, CAP-482-20, and CAP-504-0.2).

The weight average molecular weight (Mw) of the cellulose resin is preferably from 20,000 to 1,000,000, more preferably from 25,000 to 800,000, particularly preferably from 30,000 to 400,000, most preferably from 40,000 to 200,000, in terms of the value measured by gel permeation chromatography (GPC) with a solvent of tetrahydrofuran. With a weight average molecular weight in the above range, products with high mechanical strength and good solubility or formability or good casting or extruding operability can be produced.

The first optical element for use in the invention may include a polymer film mainly composed a resin composition that contains a thermoplastic resin having a negative specific birefringence and a thermoplastic resin having a positive specific birefringence. The thermoplastic resin having a negative specific birefringence is preferably an isobutylene-N-methylmaleimide copolymer, while the thermoplastic resin having a positive birefringence is preferably an acrylonitrile-styrene copolymer. The polymer film mainly composed of the resin composition may be stretched, because its potential retardation is small.

In the polymer film mainly composed of the resin composition, the content of the thermoplastic resin having a negative specific birefringence is preferably from 30 to 90 parts by weight, more preferably from 40 to 80 parts by weight, most preferably from 50 to 75 parts by weight, based on 100 parts by weight of the total solid of the polymer film, while it may be properly selected in any appropriate range depending on the type of the resin for use or the like. Within the above range, the mechanical strength can be high, and the retardation can be controlled to be small. The polymer film mainly composed of a resin composition that contains the isobutylene-N-methylmaleimide copolymer and the acrylonitrile-styrene copolymer may be prepared by the method described in JP-A No. 05-9193.

Any appropriate molding method may be used to form the thermoplastic resin-containing polymer film. For example, an appropriate method may be properly selected from compression molding, transfer molding, injection molding, extrusion molding, blow molding, powder molding, FRP molding, and solvent casting. In particular, solvent casting is preferred, because it can produce films with good smoothness or optical uniformity. Specifically, the solvent casting method may include the steps of degassing a thick solution (dope) of a resin composition containing the thermoplastic resin as a main component and additives and the like in a solvent, uniformly casting the solution into a sheet on the surface of an endless stainless steel belt or a rotating drum, and evaporating the solvent to form a film.

The conditions for the molding of the thermoplastic resin-containing polymer film may be properly selected depending on the composition or type of the resin, the type of the molding method, or the like. In the case of the solvent casting method, examples of the solvent type for use in the method include cyclopentanone, cyclohexanone, methyl isobutyl ketone, toluene, ethyl acetate, dichloromethane, and tetrahydrofuran. The method for evaporating the solvent preferably includes gradually raising the temperature from a low temperature to a high temperature with an air circulation type drying oven or the like. The temperature for the evaporation of the solvent is preferably in the range of 50° C. to 250° C., more preferably in the range of 80° C. to 150° C. If the above conditions are selected with respect to the type of the solvent and the drying temperature, polymer films with high smoothness or optical uniformity can be obtained. The Re[590] and Rth[590] of the thermoplastic resin-containing polymer film may appropriately be adjusted depending on the composition or type of the resin, the drying conditions, the thickness of the film after the molding, or the like. For example, the method for controlling the Re[590] and Rth[590] of the cellulose resin-containing polymer film and making them small includes the method described in Examples 1 and 2 of JP-A No. 2005-105139.

The thermoplastic resin-containing polymer film may further contain any appropriate additive. Examples of the additive include plasticizers, thermal stabilizers, light stabilizers, lubricants, antioxidants, ultraviolet absorbing agents, flame retardants, colorants, antistatic agents, compatibilizers, crosslinking agents, and thickeners. The type and amount of the additive to be used may appropriately be set depending on purpose. For example, the content (weight ratio) of the additive is preferably more than 0 and not more than 20 parts by weight, more preferably more than 0 and not more than 10 parts by weight, most preferably more than 0 and not more than 5 parts by weight, based on 100 parts by weight of the thermoplastic resin.

A commercially available film may be used as the thermoplastic resin-containing polymer film without being processed. Alternatively, a commercially available film may be subjected to secondary working such as stretching and/or relaxation before use. Examples of the commercially available norbornene resin-containing polymer film include ARTON series manufactured by JSR Corporation (trade names: ARTON F, ARTON FX, and ARTON D) and ZEONOR series manufactured by OPTES INC. (trade names: ZEONOR ZF14 and ZEONOR ZF16). Examples of the commercially available cellulose resin-containing polymer film include Fujitack series manufactured by Fuji Photo Film Co., Ltd. (trade names: ZRF80S, TD80UF and TDY-80UL) and KC8UX2M (trade name) manufactured by Konica Minolta Opto, Inc.

In a case where the first optical element used in the invention is a laminate of two retardation films, the first optical element preferably comprises a first retardation film and a second retardation film, wherein the first retardation film satisfies the formulae:

$$Re[590] \leq 10 \text{ nm} \qquad (3)$$

and $$10 \text{ nm} < Rth[590] \leq 200 \text{ nm} \qquad (4),$$

and the second retardation film satisfies the formulae:

$$Re[590] \leq 10 \text{ nm} \qquad (5)$$

and $$-200 \text{ nm} \leq Rth[590] < -10 \text{ nm} \qquad (6),$$

wherein Re[590] and Rth[590] are an in-plane retardation and a thickness direction retardation, respectively, which are determined at 23° C. with respect to light having a wavelength of 590 nm.

The first retardation film preferably has substantially optically-negative uniaxiality and ideally has an optical axis in the normal direction. The first retardation film refers to a film whose refractive index distribution satisfies nx~ny>nz, wherein nx is its refractive index in the slow axis direction, ny is its refractive index in the fast axis direction, and nz is its refractive index in the thickness direction. In the description, nx~ny is intended to include not only the case that nx is completely equal to ny but also the case that nx is substantially equal to ny. As used herein, the term "nx is substantially equal to ny" is intended to include cases where Re[590] is from 0 nm to 10 nm, preferably from 0 nm to 6 nm, more preferably from 0 nm to 4 nm.

The Rth[590] of the first retardation film is preferably more than 10 nm and not more than 200 nm, more preferably from 20 nm to 150 nm, particularly preferably from 40 nm to 120 nm. Within the above range, retardation films with high optical uniformity can be obtained.

The first retardation film may be formed of any appropriate material. Examples of the first retardation film include a cellulose resin-containing polymer film as described in paragraphs [0049] to [0063] of JP-A No. 2005-097621, a polyimide resin-containing polymer film as described in paragraph [0100] of JP-A No. 2003-287750, a layer produced by solidifying and/or curing a composition that contains a liquid crystal compound oriented in cholesteric alignment as described in paragraph [0123] of JP-A No. 2003-287623, a layer produced by solidifying and/or curing a composition that contains a discotic liquid crystal compound as described in paragraph [0068] of JP-A No. 07-281028, and a layer produced by solidifying a water-swellable layered inorganic compound as described in paragraph [0034] of JP-A No. 09-S80233.

The second retardation film preferably has substantially optically-positive uniaxiality and ideally has an optical axis in the normal direction. The second retardation film refers to a film whose refractive index distribution satisfies nz>nx~ny, wherein nx is its refractive index in the slow axis direction, ny is its refractive index in the fast axis direction, and nz is its refractive index in the thickness direction. In the description, nx~ny is intended to include not only the case that nx is completely equal to ny but also the case that nx is substantially equal to ny. As used herein, the term "nx is substantially equal to ny" is intended to include cases where Re[590] is from 0 nm to 10 nm, preferably from 0 nm to 6 nm, more preferably from 0 nm to 4 nm.

The Rth[590] of the second retardation film is preferably not less than −200 nm and less than 10 nm, more preferably from −150 nm to −20 nm, particularly preferably from −120 nm to −40 nm. Within the above range, retardation films with high optical uniformity can be obtained.

The second retardation film may be formed of any appropriate material. Examples of the second retardation film include a layer produced by solidifying or curing a composition that contains a liquid crystal compound oriented in homeotropic alignment as described in Example 1 of JP-A No. 2002-174725 or Example 1 of JP-A No. 2003-149441, a biaxially-oriented polymer film exhibiting negative specific birefringence as described in Tosoh Research & Technology Review, Vol. 48 (2004), and a polymer film containing a cellulose resin that exhibits a negative Rth[590] value as described in paragraphs [0074] to [0091] of JP-A No. 2005-120352. The second retardation film is preferably a layer produced by solidifying or curing a composition that contains a liquid crystal compound oriented in homeotropic alignment, because thin products with high optical uniformity can be obtained.

When a laminate including the first retardation film and the second retardation film is used as the first optical element, the first retardation film side of the laminate is preferably bonded to the first polarizer. The first optical element functions as a protective layer for the first polarizer, the case that the first retardation film side of the laminate is bonded to the first polarizer as stated above is superior in protection function to the case that the second retardation film side of the laminate is bonded to the first polarizer.

(E. Second Optical Element)

Figure 4:
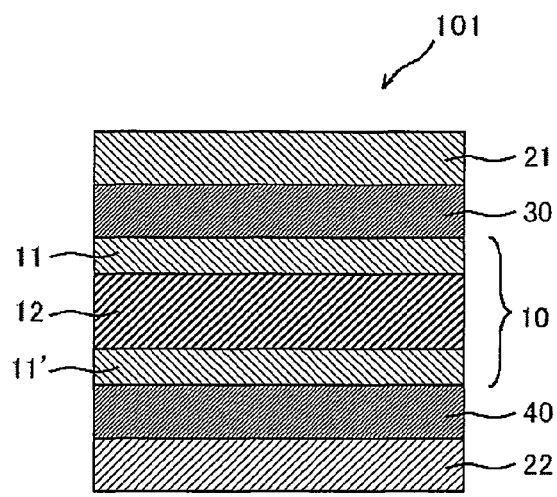
FIG. 4 is a schematic cross-sectional view of a liquid crystal panel according to another embodiment of the invention.
Figure 5:
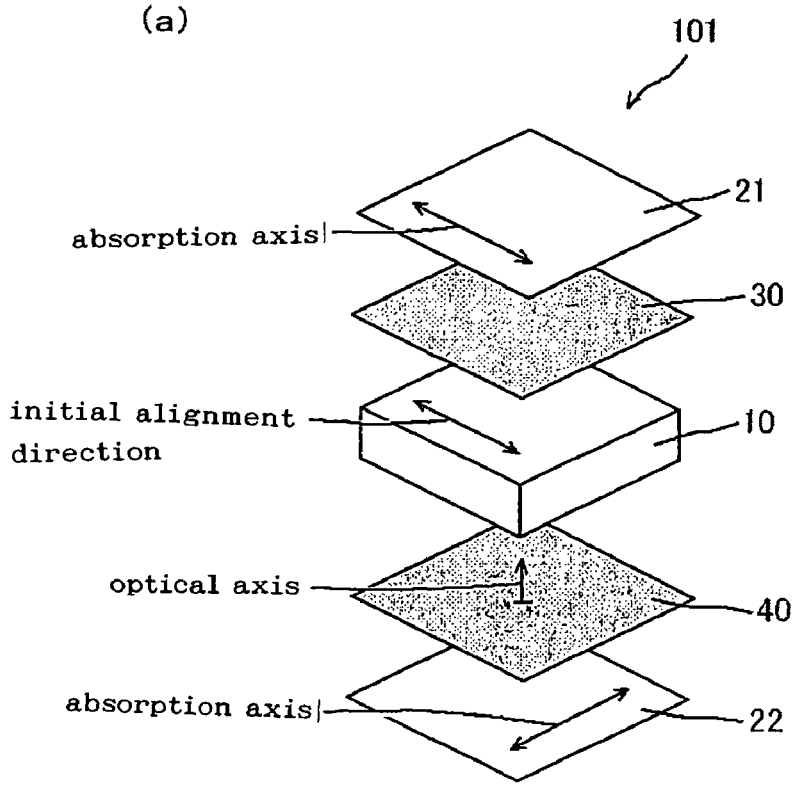
FIG. 5(a) is a schematic perspective view showing a case where the liquid crystal panel of FIG. 4 uses E mode.
FIG. 5(b) is a schematic perspective view showing a case where the liquid crystal panel of FIG. 4 uses O mode.
Figure 5:
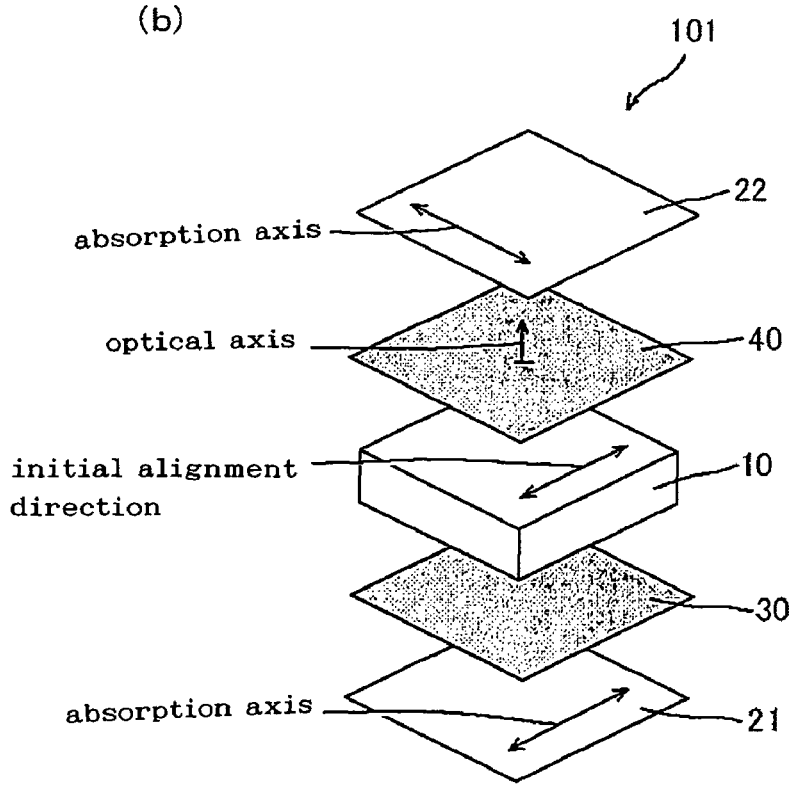

In the liquid crystal panel of the invention, any optical element is preferably placed between the liquid crystal cell and the second polarizer. FIG. 4 is a schematic cross-sectional view of the liquid crystal panel according another embodiment of the invention. FIG. 5(*a*) is a schematic perspective view showing a case where the liquid crystal panel employs E mode, and FIG. 5(*b*) is a schematic perspective view showing a case where the liquid crystal panel employs O mode. In FIGS. 5(*a*) and 5(*b*), the upper side is the viewer side, while the lower side is the backlight side. It should be noted that FIG. 4 and FIGS. 5(*a*) and 5(*b*) are depicted with a ratio different from the practical ratio between the length, width and thickness of each component. The liquid crystal panel 101 further includes the second optical element that is placed between the liquid crystal cell 10 and the second polarizer 22 and satisfies the formulae (7) and (8) below. According to this configuration, the second optical element functions as a protective layer on the liquid crystal cell side of the polarizer to prevent degradation of the polarizer so that the display properties of the liquid crystal display can be maintained at high level for a long time.

$$Re[590] \leq 10 \text{ nm} \quad (7) \text{ and}$$

$$10 \text{ nm} < Rth[590] \leq 100 \text{ nm} \quad (8),$$

wherein Re[590] and Rth[590] are an in-plane retardation and a thickness direction retardation, respectively, which are determined at 23° C. with respect to light having a wavelength of 590 nm, between the liquid crystal cell and the second polarizer.

In the E mode liquid crystal panel, as shown in FIG. 5(*a*), the first polarizer 21 and the first optical element 30 may preferably be placed on the viewer side of the liquid crystal cell 10, and the second polarizer 22 and the second optical element 40 may preferably be placed on the backlight side of the liquid crystal cell 10. In the O mode liquid crystal panel, as shown in FIG. 5(*b*), the first polarizer 21 and the first optical element 30 may preferably be placed on the backlight side of the liquid crystal cell 10, and the second polarizer 22 and the second optical element 40 may preferably be placed on the viewer side of the liquid crystal cell 10.

The second optical element preferably has substantially optically-negative uniaxiality and ideally has an optical axis in the normal direction. The second optical element refers to an element whose refractive index distribution satisfies nx~ny>nz, wherein nx is its refractive index in the slow axis direction, ny is its refractive index in the fast axis direction, and nz is its refractive index in the thickness direction. In the description, nx~ny is intended to include not only the case that nx is completely equal to ny but also the case that nx is substantially equal to ny. As used herein, the term "nx is substantially equal to ny" is intended to include cases where Re[590] is at most 10 nm.

In the case that the second optical element is used in the liquid crystal panel of the invention, the absolute value of the difference between the thickness ($d_1$) of the first optical element and that ($d_2$) of the second optical element ($\Delta d = |d_1 - d_2|$) is preferably at most 100 µm. The $\Delta d$ is more preferably at most 80 µm, particularly preferably at most 50 µm, most preferably at most 30 µm. If the $\Delta d$ is within the above range, warpage of the liquid crystal panel due to the heat of a backlight can be prevented, and liquid crystal displays with high display uniformity can be obtained.

(E-1. Optical Properties of Second Optical Element)

The Re[590] of the second optical element for use in the invention may be from 0 nm to 10 nm, more preferably from 0 nm to 6 nm, particularly preferably from 0 nm to 4 nm. Within the above range, a liquid crystal display can be obtained that can make the amount of light leakage in oblique directions small and can display clear images.

The Rth[590] of the second optical element is preferably more than 10 nm and not more than 100 nm, more preferably from 20 nm to 80 nm, particularly preferably from 30 nm to 70 nm, most preferably from 40 nm to 60 nm. If the Rth[590] is set within the above range, a liquid crystal display can be obtained that can make the amount of light leakage in oblique directions small and can display clear images.

(E-2. Means for Placing Second Optical Element)

Referring to FIG. 4, any appropriate method may be used depending on purpose in order to place the second optical element 40. Preferably, the second optical element 40 is attached to the second polarizer 22 and the liquid crystal cell 10 through a bonding layer (not shown) provided on its surface. If the gap between the respective optical elements is filled with the bonding layer in this way, the relationship between the optical axes of the respective optical elements can be prevented from fluctuating, or the respective optical elements can be prevented from rubbing against each other and being damaged. In addition, the adverse effect of a reflection or refraction generated at the interface between the layers of the respective optical elements can be reduced so that a liquid crystal display capable of displaying clear images can be obtained.

In a practical range, a slow axis can be detected from the second optical element 40. In such a case, the second optical element 40 is preferably placed such that its slow axis is substantially parallel or perpendicular to the absorption axis of the adjacent second polarizer 22. Preferably, the second optical element 40 is placed such that its slow axis is substantially parallel to the absorption axis of the adjacent second polarizer 22, because such placement allows roll preparation and easy lamination so that the production efficiency can be significantly improved. As used herein, the term "substantially parallel" is intended to include cases where the angle between the slow axis of the second optical element 40 and the absorption axis of the second polarizer 22 is 0°±2°, preferably 0°±1°, more preferably 0°±0.5°. The term "substantially perpendicular" is intended to include cases where the angle between the slow axis of the second optical element 40 and the absorption axis of the second polarizer 22 is 90°±2°, preferably 90°±1°, more preferably 90°±0.5°.

The thickness of the bonding layer may be appropriately determined depending on intended purpose, adhesive strength or the like. The thickness of the bonding layer is preferably from 0.1 µm to 100 µm, more preferably from 0.5 µm to 50 µm. Within the above range, the bonded optical element or polarizer can be prevented from separating or flaking so that adhesive strength and time with no practically adverse effect can be obtained.

Any appropriate material may be properly selected from the materials illustrated in Section C-2 in order to form the bonding layer. A pressure-sensitive adhesive using an acrylic polymer as a base polymer (also referred to as pressure-sensitive acrylic adhesive) is preferably used, because it can exhibit good optical transparency, moderate wettability or cohesiveness and adhesive properties, and high weather resistance or heat resistance. A commercially available optical double-side tape may be used, as it is, for the bonding layer. For example, the commercially available optical double-side tape includes SK-2057 (trade name) manufactured by Soken Chemical & Engineering Co., Ltd.

(E-3. Structure of Second Optical Element)

The composition (layered structure) of the second optical element for use in the invention is not particularly limited, as long as it satisfies the optical properties as described above in Section E-1. Specifically, the second optical element may be a single retardation film or may be a laminate composed of two or more retardation films. Preferably, the second optical element is a single retardation film or a laminate of two retardation films, because such a structure can reduce the amount of light leakage in oblique directions or the amount of color shift. The second optical element consisting of a laminate may include a bonding layer. Two or more retardation films in the laminate may be the same or different. The retardation film is described in detail later in Section E-4.

The Re[590] and Rth[590] of the retardation film for use in the second optical element may be appropriately selected depending on the number of the retardation films for use. For example, when the second optical element is composed of a single retardation film, the Re[590] and Rth[590] of the retardation film are preferably equal to the Re[590] and Rth[590] of the second optical element, respectively. Thus, the retardation of the bonding layer for use in laminating the second optical element to the polarizer is preferably as small as possible. For example, when the second optical element is formed as a laminate including two or more retardation films, it is preferably designed such that the total of Re[590] or Rth[590] of the respective retardation films is equal to the Re[590] or Rth[590] of the second optical element, respectively.

Specifically, the second optical element whose Re[590] and Rth[590] are 0 nm and 60 nm, respectively, may be prepared by laminating two retardation films each with an Re[590] of 5 nm and an Rth[590] of 30 nm in such a manner that the respective slow axes are perpendicular to each other. The Re[590] of the optical element can be reduced by placing two retardation films in such a manner that the respective slow axes are perpendicular to each other. While only the cases of at most two retardation films are illustrated for ease of illustration, it will be understood that the invention is applicable to any laminate including three or more retardation films.

Any appropriate value may properly be selected as the entire thickness of the second optical element depending on the entire thickness of the first optical element. The entire thickness of the second optical element is preferably set equal to the entire thickness of the first optical element. Specifically, the entire thickness of the second optical element is preferably from 10 µm to 200 µm, more preferably from 20 µm to 200 µm, particularly preferably from 30 µm to 150 µm, most preferably from 30 µm to 100 µm. Within the above range, optical elements with high optical uniformity can be obtained.

(E-4. Retardation Film for Use in Second Optical Element)

Any appropriate retardation film may be used for the second optical element. The retardation film preferably has high transparency, high mechanical strength, high thermal stability, high water-blocking properties, or the like.

The thickness of the retardation film may vary with the number of the layers to be laminated. Typically, the second optical element is preferably designed to have a total thickness of 10 µm to 200 µm. In a case where the second optical element is made of a single retardation film, for example, the film preferably has a thickness of 10 µm to 200 µm (namely a thickness equal to the total thickness of the second optical element). In a case where the second optical element is a laminate of two retardation films, for example, each retardation film may have any thickness, as long as the total of the thicknesses becomes a preferred thickness for the whole of the second optical element. Accordingly, the respective retardation films may have the same thickness or different thicknesses. In an embodiment where two retardation films are laminated, one of the retardation films preferably has a thickness of 5 µm to 100 µm.

The absolute value (C[590] (m$^2$/N) of the photoelastic coefficient of the retardation film is preferably from $1\times10^{-12}$ to $100\times10^{-12}$, more preferably from $1\times10^{-12}$ to $60\times10^{-12}$, particularly preferably from $1\times10^{-12}$ to $30\times10^{-12}$. When used for a liquid crystal display, the retardation film with a smaller absolute value of photoelastic coefficient can reduce the occurrence of deviation or fluctuation in the retardation due to the shrinking stress of the polarizer or the heat of the backlight so that it can form a liquid crystal display with high display uniformity.

The transmittance of the retardation film determined at 23° C. with respect to light having a wavelength of 590 nm is preferably at least 80%, more preferably at least 85%, particularly preferably at least 90%. The second optical element also preferably has the same light transmittance. The transmittance has a theoretical upper limit of 100% and an achievable upper limit of 96%.

The second optical element for use in the invention preferably includes a thermoplastic resin-containing retardation film. The thermoplastic resin may be the same as any of those described in Section D-4. The same retardation film as the second retardation film for use in the first optical element may be used for the second optical element, as long as it satisfies the optical properties described in Section E-1.

(F. Liquid Crystal Display)

Figure 6:
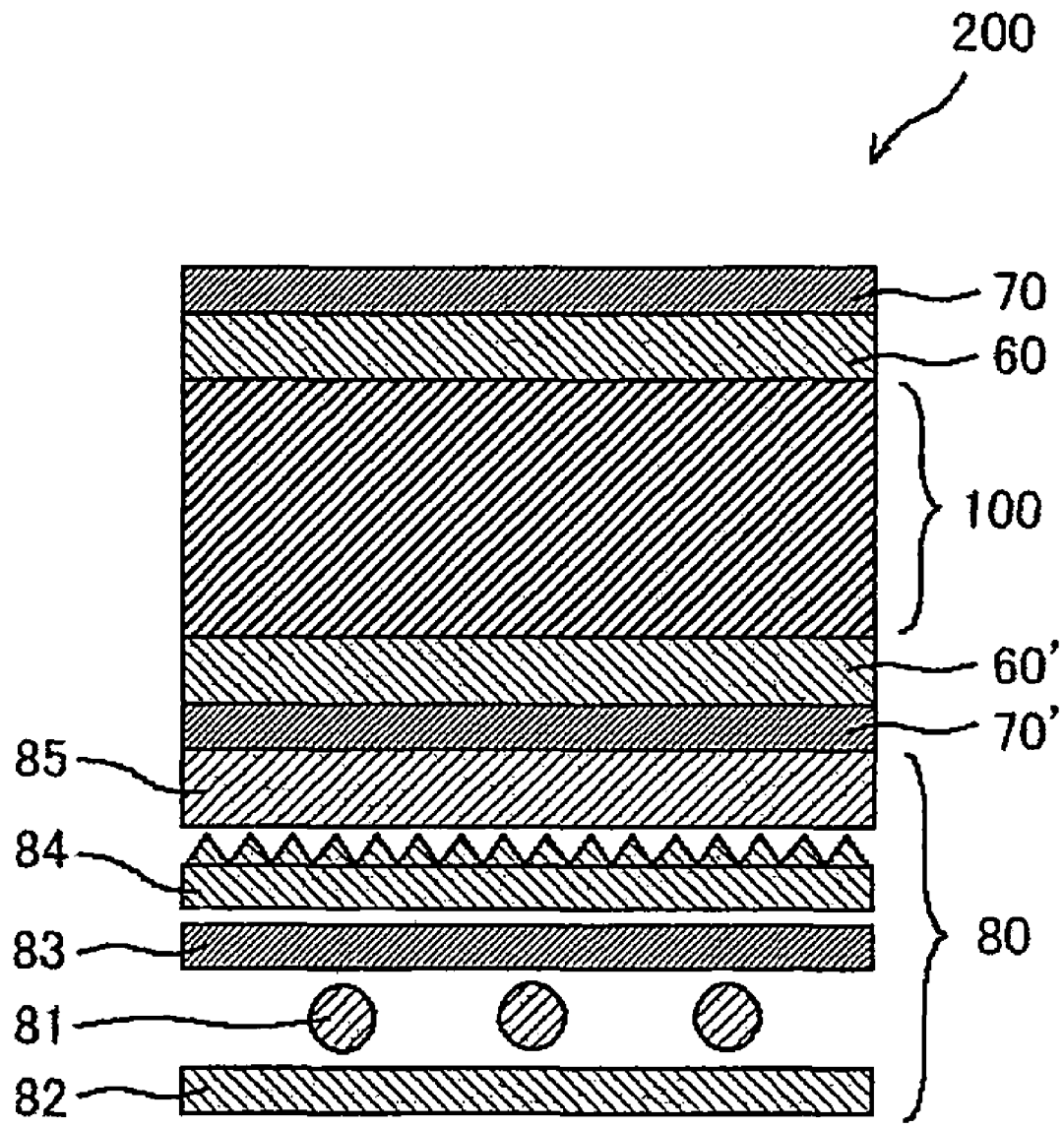
FIG. 6 is a schematic cross-sectional view of a liquid crystal display according to a preferred embodiment of the invention.
Figure 7:
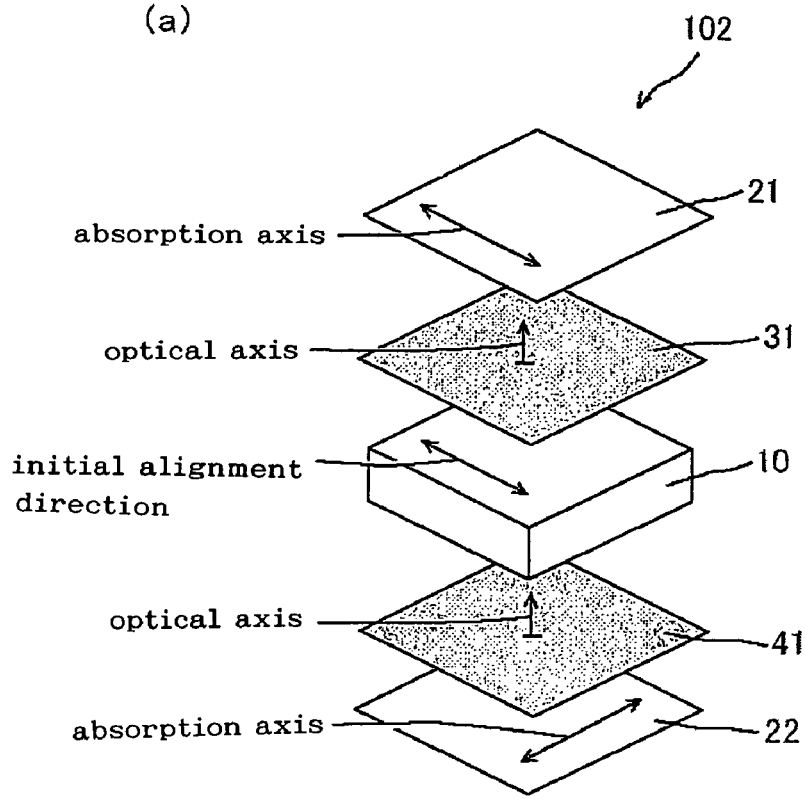
FIG. 7(a) is a schematic perspective view of a liquid crystal panel used in Comparative Example 1.
FIG. 7(b) is a schematic perspective view of a liquid crystal panel used in Comparative Example 3.
Figure 7:
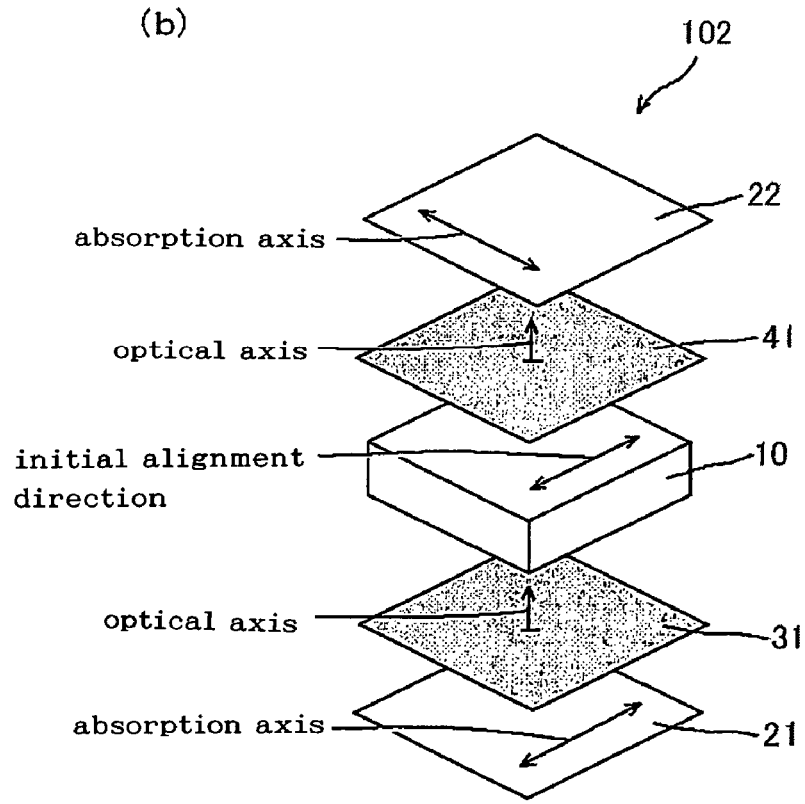

FIG. 6 is a schematic cross-sectional view of a liquid crystal display according to a preferred embodiment of the invention. It should be noted that for ease of views FIG. 6 is depicted with a ratio different from the practical ratio between the length, width and thickness of each component. The liquid crystal display 200 includes the liquid crystal panel 100 (or the liquid crystal panel 101), protective layers 60 and 60' placed on both sides of the liquid crystal panel 100 (or the liquid crystal panel 101), surface-treated layers 70 and 70' placed outside the protective layers 60 and 60', and a backlight unit 80 placed outside the surface-treated layer 70' (on the backlight side). The backlight unit 80 includes a backlight 81, a reflecting film 82, a diffusing plate 83, a prism sheet 84, and a brightness enhancement film 85. The use of these optical components allows the production of a liquid crystal panel with superior display properties. The optical components illustrated in FIG. 7 may be partially omitted or replaced with any other optical component(s) depending on application such as liquid crystal display-illuminating method and liquid crystal cell-driving mode.

Any appropriate film may be used for the protective layer depending on purpose. The protective layer is used to prevent shrinking or expansion of the polarizer or to prevent ultraviolet light-induced degradation. For example, a polymer film that contains a cellulose resin or a norbornene resin is used as the protective layer. The thickness of the polymer film is preferably from 10 μm to 200 μm. The protective layer may also serve as a base film for the surface-treated layer as described later. A commercially available polymer film may also be used, as it is, for the protective layer. Examples of the commercially available cellulose resin-containing polymer film include Fujitack series manufactured by Fuji Photo Film Co., Ltd. and KC8UX2M (trade name) manufactured by Konica Minolta Opto, Inc. Examples of the commercially available norbornene resin-containing polymer film include ARTON series manufactured by JSR Corporation and ZEONOR series manufactured by OPTES INC.

The surface-treated layer may be a treated layer that has been subjected to a treatment such as a hard coat treatment, an antistatic treatment, an anti-reflection treatment, and a diffusion treatment (also called anti-glare treatment). These surface-treated layers are used for the purpose of preventing staining or scratching of the screen or preventing difficulty in viewing display images due to the glare of room fluorescent light or sunlight on the screen. A layer that is produced by fixing a treatment agent for forming the treated layer on the surface of a base film is generally used as the surface-treated layer. The base film may also serve as the protective layer. The surface-treated layer may also be a multilayer structure such as a laminate having a hard-coat treatment layer stacked on an antistatic treatment layer. A commercially available surface-treated layer may also be used as it is. Examples of the commercially-available, hard-coat-treated, antistatic-treated film include KC8UX-HA (trade name) manufactured by Konica Minolta Opto, Inc. Examples of the commercially-available film surface-treated by antireflection treatment include ReaLook series manufactured by Nippon Oil & Fats Co., Ltd.

Any appropriate illuminating method may be used for illuminating the liquid crystal display including the liquid crystal panel of the invention. Examples of the illuminating method include transmissive types in which a backlight is used as a light source and emits light for view from the backside, reflective types in which outside light is applied to the screen and viewed, and transflective types having both characteristics at the same time. The illuminating method is preferably of the transmissive type. In a case where a direct system is used for the illuminating method, the backlight unit generally includes a backlight, a reflecting film, a diffusing plate, a prism sheet, and a brightness enhancement film. In a case where an edge light system is used, the backlight unit also includes a light-guiding plate and a light reflector in addition to the above components for the direct system.

Any appropriate backlight may be used. Examples of the backlight include cold cathode fluorescent tube (CCFLs), light-emitting diodes (LEDs), organic EL devices (OLEDs), and field emission devices (FEDs). In cases where a cold cathode fluorescent tube is used as a backlight, the illuminating method may use a "direct system" for applying light from just below the liquid crystal or may use an "edge light system" for applying light from the side edge of the liquid crystal. The direct system has the advantage of producing high brightness, while the edge light system can produce a thinner liquid crystal display than the direct system. The latter also offers other advantages in that the influence of heat from the light source to each component can be made small. If a light-emitting diode is used for the backlight, the color of the light source may be white or three colors RGB. If the light-emitting diode is an RGB three-color light source, a field sequential liquid crystal display can be obtained which allows color display without using a color filter.

The reflecting film is used to prevent light from escaping to the side opposite to the viewer side of the liquid crystal and to efficiently introduce light from the backlight into a light-guiding plate. For example, the reflecting film may be a laminated film of multilayers of a silver-vapor-deposited polyethylene terephthalate film or polyester resin. The reflecting film preferably has a reflectance of at least 90% over the wavelength range of 410 nm to 800 nm. The reflecting film typically has a thickness of 50 μm to 200 μm. A commercially available reflecting film may be used as it is. Examples of the commercially available reflecting film include REFWHITE series manufactured by Kimoto Co., Ltd. and Vikuiti ESR series manufactured by Sumitomo 3M Limited.

The light-guiding plate is used to distribute light from the backlight throughout the screen. For example, the light-guiding plate may be a tapered product of an acrylic resin, a polycarbonate resin, a cycloolefin resin or the like whose thickness decreases as it goes away from the light source.

The diffusing plate is used to guide the light from the light-guiding plate into a wide angle and to evenly brighten the screen. The diffusing plate can also reduce fluctuations in the brightness of the backlight. For example, the diffusing plate may be a roughened polymer film or a diffusing agent-containing polymer film. The diffusing plate preferably has a haze of 85% to 92%. Additionally, the total light transmittance of the diffusing plate is at least 90%. A commercially available diffusing plate may be used as it is. Examples of the commercially available diffusing plate include OPLUS series manufactured by KEIWA Inc. and LIGHTUP series manufactured by Kimoto Co., Ltd.

The prism sheet is used to concentrate the wide-angle light from the light-guiding plate in a specific direction and to enhance the brightness of the liquid crystal display in the front direction. For example, the prism sheet may be a laminate comprising a base film of a polyester resin and a prism layer of an acrylic resin or a photosensitive resin stacked on the surface of the base film. A commercially available prism sheet may be used as it is. Examples of the commercially available prism sheet include DIAART series manufactured by Mitsubishi Rayon Co., Ltd.

The brightness enhancement film is used to enhance the brightness of the liquid crystal display in the front and oblique directions. A commercially available brightness enhancement film may be used as it is. Examples of the commercially available brightness enhancement film include NIPOCS PCF series manufactured by NITTO DENKO CORPORATION and Vikuiti DBEF series manufactured by Sumitomo 3M Limited.

In the case that the liquid crystal panel of the invention is in E mode, the liquid crystal display including the liquid crystal panel preferably has a color difference ($\Delta xy$) of at most 0.160, more preferably of at most 0.120, particularly preferably of at most 0.080, most preferably of at most 0.040, wherein the color difference ($\Delta xy$) is calculated from a hue (x0,y0) in the normal direction (azimuth angle: 0°, polar angle: 0°) and a hue (x60,y60) in an oblique direction (azimuth angle: 60°, polar angle: 60°) in the case where a black viewing image is displayed. The theoretical lower limit of the Δxy is 0. If the Δxy value is smaller, a liquid crystal display can be obtained that has a smaller amount of color shift when black viewing images are displayed. The Δxy value of conventional E mode liquid crystal panels is larger than that of O mode liquid crystal panels. In contrast, the liquid crystal panel of the invention can have a small Δxy value even when used in the E mode configuration.

In the case that the liquid crystal panel of the invention is in O mode, the liquid crystal display including the liquid crystal panel preferably has a color difference (Δxy) of at most 0.100, more preferably of at most 0.080, particularly preferably of at most 0.050, most preferably of at most 0.020, wherein the color difference (Δxy) is calculated from a hue (x0,y0) in the normal direction (azimuth angle: 0°, polar angle: 0°) and a hue (x60,y60) in an oblique direction (azimuth angle: 60°, polar angle: 60°) in the case where a black viewing image is displayed. The theoretical lower limit of the Δxy is 0. If the Δxy value is smaller, a liquid crystal display can be obtained that has a smaller amount of color shift when black viewing images are displayed. The liquid crystal panel of the invention can have a smaller Δxy value when used in the O mode configuration.

(G. Uses of the Liquid Crystal Panel of the Invention)

The liquid crystal panel and the liquid crystal display according to the invention are not limited in application and can find various applications such as OA equipment such as personal computer monitors, notebook computers, and copy machines; portable equipment such as cellular phones, watches, digital cameras, personal digital assistances (PDAs), and portable game machines; domestic electrical equipment such as video cameras, liquid crystal televisions, and microwave ovens; vehicle equipment such as back monitors, monitors for car navigation systems, and car audios; display equipment such as information monitors for stores; alarm systems such as surveillance monitors; and care and medical equipment such as care monitors and medical monitors.

In particular, the liquid crystal panel or the liquid crystal display according to the invention is preferably used in large-sized liquid crystal televisions. The screen size of the liquid crystal television including the liquid crystal panel or liquid crystal display of the invention is preferably at least wide 17 inch (373 mm×224 mm), more preferably at least wide 23 inch (499 mm×300 mm), particularly preferably at least wide 26 inch (566 mm×339 mm), most preferably at least wide 32 inch (687 mm×412 mm).

EXAMPLES

The invention is further described using the examples and the comparative examples below, which are not intended to limit the scope of the invention. The analysis methods below are each used in the examples.

(1) Method for Measuring the Moisture Percentage of Polarizers

The moisture percentage was measured using a Karl Fischer moisture meter MKA-610 (trade name, manufactured by Kyoto Electronics Manufacturing Co., Ltd.). A sample piece 10 mm×30 mm in size was cut and placed in the heating furnace at 150° C.±1° C. and measured for moisture percentage, while nitrogen gas (200 ml/minute) was bubbled into a solution in the titration cell.

(2) Method for Measuring the Single-Piece Transmittance and Degree of Polarization of Polarizers The measurement was performed at 23° C. using a spectrophotometer DOT-3 (trade name, manufactured by Murakami Color Research Laboratory).

(3) Method for Measuring Molecular Weights

Molecular weights were calculated by gel permeation chromatography (GPC) using polystyrene as a standard sample. Specifically, the measurement was performed using the equipment, tools and measurement conditions below.

Analytical equipment: HLC-8120GPC manufactured by Tosoh Corporation

Column: TSK gel Super HM-H/H4000/H3000/H2000

Column size: 6.0 mm I.D.×150 mm

Eluant: tetrahydrofuran

Flow rate: 0.6 ml/minute

Detector: RI

Column temperature: 40° C.

Injection amount: 20 μl (4) Method for Measuring Thickness

For thicknesses of less than 10 μm, measurement was performed using a spectrophotometer for thin films, Instant Multi-Photometry System MCPD-2000 (trade name, manufactured by Otsuka Electronics Co., Ltd.). For thicknesses of 10 μm or more, measurement was performed using a digital micrometer KC-351C model (trade name, manufactured by Anritsu Company).

(5) Method for Measuring the Average Refractive Index of Films

The measurement was performed using an Abbe refractometer DR-M4 (trade name, manufactured by ATAGO CO., LTD.), and the average refractive index was determined from refractive indexes measured at 23° C. with respect to light having a wavelength of 589 nm.

(6) Method for Measuring Retardations (Re and Rth)

Using a retardation meter KOBRA 21-ADH (trade name, manufactured by Oji Scientific Instruments) based on parallel Nicol rotation method, the measurement was performed at 23° C. with respect to light having a wavelength of 590 nm.

(7) Method for Measuring Transmittance (T[590])

Using an ultraviolet and visible spectrophotometer V-560 (trade name, manufactured by JASCO Corporation), the measurement was performed at 23° C. with respect to light having a wavelength of 590 nm.

(8) Method for Measuring Absolute Value of Photoelastic Coefficient (C[590])

While stress (5 to 15 N) was applied to a sample (2 cm×10 cm in size) supported at both ends, the retardation of the center of the sample was measured (23° C./a wavelength of 590 nm) using a spectroscopic ellipsometer M-220 (trade name, manufactured by JASCO Corporation). The photoelastic coefficient was calculated from the slope of a function of the stress and the retardation.

(9) Method for Measuring the Amount of Color Shift (Δxy) of Liquid Crystal Displays A black viewing image was displayed on the liquid crystal display. Thirty minutes after the backlight was turned on in a darkroom at 23° C., the hue (x0,y0) of the display screen in the normal direction (azimuth angle: 0°, polar angle: 0°) and the hue (x60,y60) of the display screen in an oblique direction (azimuth angle: 60°, polar angle: 60°) were measured with EZ Contrast 160D (trade name, manufactured by ELDIM), and the amount of color shift was calculated from the formula:

$$\Delta xy = \{(x0-x60)^2 + (y0-y60)^2\}^{1/2}.$$

(Preparation of Polarizers)

Reference Example 1

A polymer film mainly composed of polyvinyl alcohol (9P75R (trade name), 75 μm in thickness, 2,400 in average degree of polymerization, 99.9% by mole in saponification degree, manufactured by Kuraray Co., Ltd.) was uniaxially stretched 2.5 times with a roll stretching machine, while being dyed in a dye bath containing iodine and potassium iodide and maintained at 30° C.±3° C. The polyvinyl alcohol film was then uniaxially stretched so as to have a length 6 times the original length, while being subjected to a crosslinking reaction in an aqueous solution containing boron and potassium iodide and maintained at 60° C.±3° C. The resulting film was dried for 30 minutes in an air circulation type thermostatic oven at 50° C.±1° C., so that polarizers (named P1 and P2) were obtained. The optical properties of Polarizers P1 and P2 are as shown in Table 1.

TABLE 1

|  | Reference Example 1 |
| --- | --- |
| Polarizer | P1, P2 |
| Moisture Percentage (%) | 26 |
| Thickness (μm) | 28 |
| Single-Piece Transmittance (%) | 44.1 |
| Parallel Transmittance (%) | 39.0 |
| Perpendicular Transmittance (%) | 0.02 |
| Degree of Polarization (%) | 99.95 |
| Hue a Value | −1.4 |
| Hue b Value | 3.4 |

(Preparation of First Optical Element)

Reference Example 2

A 40 μm-thick norbornene resin-containing polymer film (ZEONOR ZF14-040, 1.53 in average refractive index, manufactured by OPTES INC.) was used without being processed and named Polymer Film 1-A, whose properties are as shown in Table 2.

Reference Example 3

An 80 μm-thick cellulose resin-containing polymer film (ZRF 80S (trade name), 1.48 in average refractive index, manufactured by Fuji Photo Film Co., Ltd.) was used without being processes and named Polymer Film 1-B, whose properties are as shown in Table 2.

Reference Example 4

An ethyl silicate solution (COLCOAT P manufactured by COLCOAT CO., Ltd) was applied with a gravure coater to a polyethylene terephthalate film (S-27E, 75 μm in thickness, manufactured by Toray Industries, Inc.) and dried at 130° C. for 30 seconds to form a 0.1 μm-thick glassy polymer film. Five parts by weight of a polymer liquid crystal represented by Structural Formula (I) below (5,000 in weight average molecular weight (Mw), 20 parts by weight of a polymerizable functional group-containing liquid crystal compound (Paliocolor LC242 (trade name) (ne=1.654, no=1.523) manufactured by BSAF), and 1.25 parts by weight of a photopolymerization initiator (Irgacure 907 (trade name) manufactured by Ciba Specialty Chemicals Inc.) were dissolved in 75 parts by weight of cyclohexanone to form a composition mixture solution. The mixture solution was applied with a rod coater onto the glassy polymer film on the polyethylene terephthalate film serving as a substrate, dried for 2 minutes in an air circulation type thermostatic oven at 80° C.±1° C., and then cooled to room temperature, so that a layer of the solidified composition containing the liquid crystal compound oriented in homeotropic alignment was formed on the surface of the polyethylene terephthalate film. Under air atmosphere, the mixture solution-coated side was irradiated with 400 mJ/cm² (a measurement at a wavelength of 365 nm) of ultraviolet light (using an irradiation device with a metal halide lamp as a light source) so that the layer (0.6 μm in thickness) of the solidified composition was cured and that a layer of the cured composition containing the liquid crystal compound oriented in homeotropic alignment was formed. While the polyethylene terephthalate film used as the substrate was peeled, only the cured layer was stacked on the surface of a cellulose resin-containing polymer film (TDY-80UL (trade name) manufactured by Fuji Photo Film Co., Ltd.) via a pressure-sensitive acrylic adhesive layer (10 μm in thickness) such that the slow axes of them were perpendicular to each other. The resulting laminate of the cellulose resin-containing polymer film and the cured layer of the composition containing the liquid crystal compound oriented in homeotropic alignment was named Polymer Film 1-C, whose properties are as shown in Table 2. The Re[590] and Rth[590] of the cellulose resin-containing polymer film alone were 3.2 nm and 55.6 nm, respectively. The Re[590] and Rth[590] of the cured layer alone of the composition containing the liquid crystal compound oriented in homeotropic alignment were 3.1 nm and −60.6 nm, respectively.

[Formula 1]

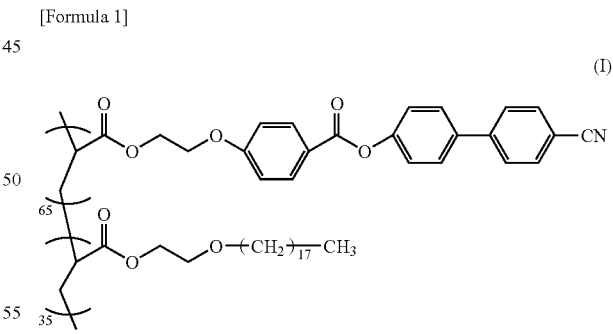

TABLE 2

|  | Reference Example 2 | Reference Example 3 | Reference Example 4 |
| --- | --- | --- | --- |
| Polymer Film | 1-A | 1-B | 1-C |
| Thickness (μm) | 40 | 80 | 90.6 |
| Transmittance (%) | 92 | 90 | 91 |
| Re[590](nm) | 2.0 | 1.0 | 0.1 |

TABLE 2-continued

|  | Reference Example 2 | Reference Example 3 | Reference Example 4 |
|---|---|---|---|
| Rth[590](nm) | 8.2 | 3.1 | −5.0 |
| C[590] × $10^{-12}$($m^2$/N) | 3.1 | 14.0 | Unmeasured |

(Preparation of Second Optical Element)

Reference Example 5

An 80 μm-thick cellulose resin-containing polymer film (TDY-80UL (trade name), 1.48 in average refractive index, manufactured by Fuji Photo Film Co., Ltd.) was used without being processed and named Polymer Film 2-A, whose properties are as shown in Table 3.

TABLE 3

|  | Reference Example 5 |
|---|---|
| Polymer Film | 2-A |
| Thickness (μm) | 80 |
| Transmittance (%) | 91 |
| Re[590](nm) | 3.2 |
| Rth[590](nm) | 55.6 |
| C[590] × $10^{-12}$($m^2$/N) | 17.8 |

(Preparation of Liquid Crystal Cell)

Reference Example 6

A liquid crystal panel was taken out of an IPS mode liquid crystal cell-containing liquid crystal display (a liquid crystal television (screen size: 698 mm×392 mm) manufactured by Hitachi, Ltd. (trade name: Wooo, model number: W32-L7000)). All the optical films placed on both sides of the liquid crystal cell were removed from the liquid crystal panel, and the glass faces (front and rear) of the liquid crystal cell were cleaned. The resulting liquid crystal cell was named Liquid Crystal Cell A.

Reference Example 7

A liquid crystal panel was taken out of an IPS mode liquid crystal cell-containing liquid crystal display (a liquid crystal television (screen size: 698 mm×392 mm) manufactured by Toshiba Corporation (trade name: Beautyful Face, model number: 32LC100)). All the optical films placed on both sides of the liquid crystal cell were removed from the liquid crystal panel, and the glass faces (front and rear) of the liquid crystal cell were cleaned. The resulting liquid crystal cell was named Liquid Crystal Cell B.

(Preparation of E mode Liquid Crystal Panel and Liquid Crystal Display)

Example 1

Polymer Film 1-A obtained in Reference Example 2 and serving as the first optical element was attached via a pressure-sensitive acrylic adhesive layer (23 μm in thickness) to the viewer side of Liquid Crystal Cell A obtained in Reference Example 6 such that its slow axis was substantially parallel (0°±0.5°) to the long side of Liquid Crystal Cell A. Polarizer P1 obtained in Reference Example 1 and serving as the first polarizer was attached via an adhesive layer (1 μm in thickness) to the surface of Polymer Film 1-A such that its absorption axis was substantially parallel (0°±0.5°) to the long side of Liquid Crystal Cell A. At this time, the absorption axis of Polarizer P1 was substantially parallel to the initial alignment direction of Liquid Crystal Cell A. Polymer Film 2-A obtained in Reference Example 5 and serving as the second optical element was then attached via a pressure-sensitive acrylic adhesive layer (23 μm in thickness) to the backlight side surface of Liquid Crystal Cell A such that its slow axis was substantially perpendicular (90°±0.5°) to the long side of Liquid Crystal Cell A. Subsequently, Polarizer P2 obtained in Reference Example 1 and serving as the second polarizer was attached via an adhesive layer (1 μm in thickness) to the surface of Polymer Film 2-A such that its absorption axis was substantially perpendicular (90°±0.5°) to the long side of Liquid Crystal Cell A. At this time, the absorption axis of Polarizer P1 was substantially perpendicular to the absorption axis of Polarizer P2. Polymer Film 2-A obtained in Reference Example 5 and serving as the protective layer was attached via an adhesive layer (1 μm in thickness) to each of the outsides (the sides opposite to the liquid crystal cell) of Polarizers P1 and P2.

The resulting liquid crystal panel (named Liquid Crystal Panel A) was the E mode structure as shown in FIG. 5(a). Liquid Crystal Panel A was combined with a backlight unit to form a liquid crystal display (named Liquid Crystal Display A). Liquid Crystal Display A had good display uniformity over the entire face, immediately after the backlight was turned on. After the backlight was maintained on for 30 minutes, Liquid Crystal Display A was measured for the amount of color shift (Δxy) in oblique directions. The resulting properties are as shown in Table 4.

Example 2

A liquid crystal panel (named Liquid Crystal Panel B) and a liquid crystal display (named Liquid Crystal Display B) were prepared using the process of Example 1 except that Polymer Film 1-B obtained in Reference Example 3 was used as the first optical element. Liquid Crystal Panel B was the E mode structure as shown in FIG. 5(a). Liquid Crystal Display B had good display uniformity over the entire face, immediately after the backlight was turned on. After the backlight was maintained on for 30 minutes, Liquid Crystal Display B was measured for the amount of color shift (Δxy) in oblique directions. The resulting properties are as shown in Table 4.

Example 3

A liquid crystal panel (named Liquid Crystal Panel C) and a liquid crystal display (named Liquid Crystal Display C) were prepared using the process of Example 1 except that Polymer Film 1-C obtained in Reference Example 4 was used as the first optical element and that the cellulose resin-containing polymer film side of Polymer Film 1-C was attached to Polarizer P1. Liquid Crystal Panel C was the E mode structure as shown in FIG. 5(a). Liquid Crystal Display C had good display uniformity over the entire face, immediately after the backlight was turned on. After the backlight was maintained on for 30 minutes, Liquid Crystal Display C was measured for the amount of color shift (Δxy) in oblique directions. The resulting properties are as shown in Table 4.

Comparative Example 1

A liquid crystal panel (named Liquid Crystal Panel H) and a liquid crystal display (named Liquid Crystal Display H)

were prepared using the process of Example 1 except that Polymer Film 2-A obtained in Reference Example 5 was used as each of the first and second optical elements. Liquid Crystal Panel H was the E mode structure as shown in FIG. 7(a). Liquid Crystal Display H had good display uniformity over the entire face, immediately after the backlight was turned on. After the backlight was maintained on for 30 minutes, Liquid Crystal Display H was measured for the amount of color shift (Δxy) in oblique directions. The resulting properties are as shown in Table 4.

Comparative Example 2

Figure 8:
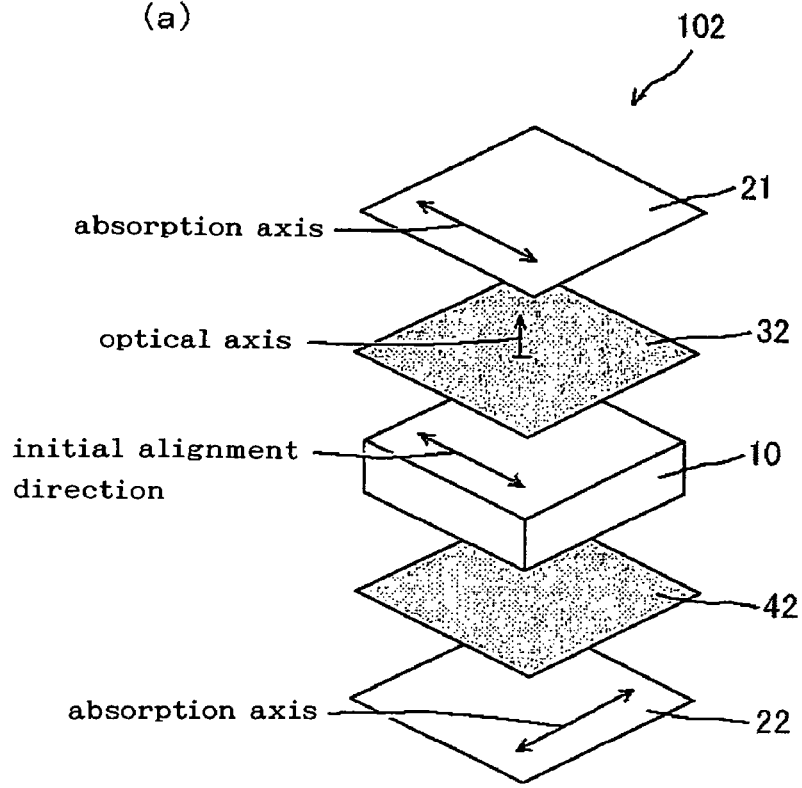
FIG. 8(a) is a schematic perspective view of a liquid crystal panel used in Comparative Example 2.
FIG. 8(b) is a schematic perspective view of a liquid crystal panel used in Comparative Example 4.
Figure 8:
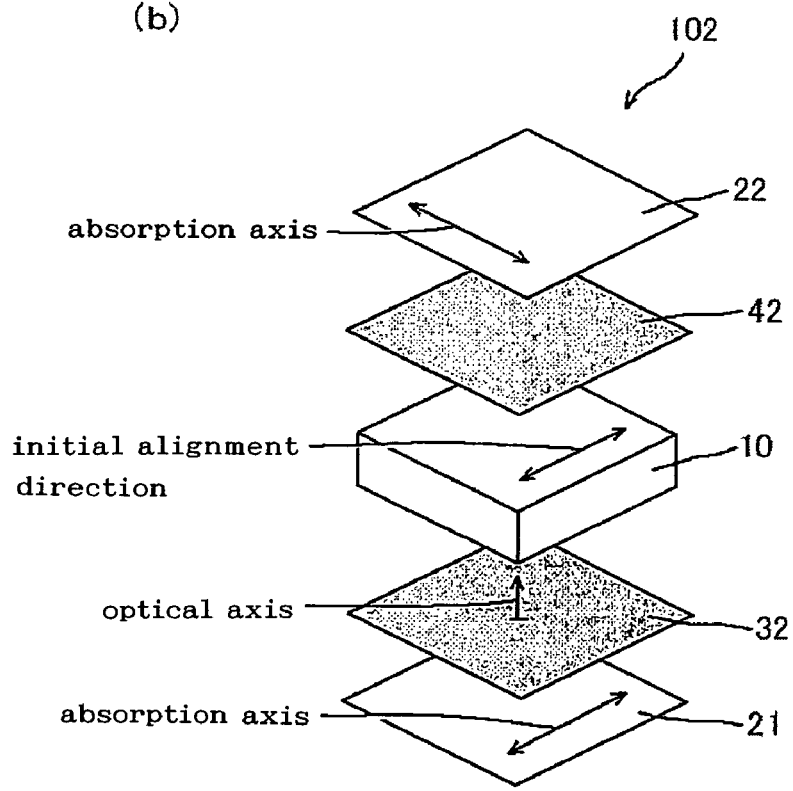

A liquid crystal panel (named Liquid Crystal Panel I) and a liquid crystal display (named Liquid Crystal Display I) were prepared using the process of Example 1 except that Polymer Film 2-A obtained in Reference Example 5 was used as the first optical element and that Polymer Film 1-B obtained in Reference Example 3 was used as the second optical element. Liquid Crystal Panel I was the E mode structure as shown in FIG. 8(a). Liquid Crystal Display I had good display uniformity over the entire face, immediately after the backlight was turned on. After the backlight was maintained on for 30 minutes, Liquid Crystal Display I was measured for the amount of color shift (Δxy) in oblique directions. The resulting properties are as shown in Table 4.

izer P2 obtained in Reference Example 1 and serving as the second polarizer was attached via an adhesive layer (1 μm in thickness) to the surface of Polymer Film 2-A such that its absorption axis was substantially parallel (0°±0.5°) to the long side of Liquid Crystal Cell B. At this time, the absorption axis of Polarizer P1 was substantially perpendicular to the absorption axis of Polarizer P2. Polymer Film 2-A obtained in Reference Example 5 and serving as the protective layer was attached via an adhesive layer (1 μm in thickness) to each of the outsides (the sides opposite to the liquid crystal cell) of Polarizers P1 and P2.

The resulting liquid crystal panel (named Liquid Crystal Panel D) was the O mode structure as shown in FIG. 5(b). Liquid Crystal Panel D was combined with a backlight unit to form a liquid crystal display (named Liquid Crystal Display D). Liquid Crystal Display D had good display uniformity over the entire face, immediately after the backlight was turned on. After the backlight was maintained on for 30 minutes, Liquid Crystal Display D was measured for the amount of color shift (Δxy) in oblique directions. The resulting properties are as shown in Table 5.

Example 5

A liquid crystal panel (named Liquid Crystal Panel E) and a liquid crystal display (named Liquid Crystal Display E)

TABLE 4

| | First Optical Element | | | Second Optical Element | | | Third Optical Element | | |
|---|---|---|---|---|---|---|---|---|---|
| | Polymer Film | Re [590] (nm) | Rth [590] (nm) | Polymer Film | Re [590] (nm) | Rth [590] (nm) | Liquid Crystal Panel | Structure | Δxy |
| Example 1 | 1-A | 2.0 | 8.2 | 2-A | 3.2 | 55.6 | A | FIG. 5(a) | 0.094 |
| Example 2 | 1-B | 1.0 | 3.1 | 2-A | 3.2 | 55.6 | B | FIG. 5(a) | 0.035 |
| Example 3 | 1-C | 0.1 | −5.0 | 2-A | 3.2 | 55.6 | C | FIG. 5(a) | 0.077 |
| Comparative Example 1 | 2-A | 3.2 | 55.6 | 2-A | 3.2 | 55.6 | H | FIG. 7(a) | 0.190 |
| Comparative Example 2 | 2-A | 3.2 | 55.6 | 1-B | 1.0 | 3.1 | I | FIG. 8(a) | 0.212 |

(Preparation of O mode Liquid Crystal Panel and Liquid Crystal Display)

Example 4

Polymer Film 1-A obtained in Reference Example 2 and serving as the first optical element was attached via a pressure-sensitive acrylic adhesive layer (23 μm in thickness) to the viewer side of Liquid Crystal Cell B obtained in Reference Example 7 such that its slow axis was substantially perpendicular (90°±0.5°) to the long side of Liquid Crystal Cell B. Polarizer P1 obtained in Reference Example 1 and serving as the first polarizer was attached via an adhesive layer (1 μm in thickness) to the surface of Polymer Film 1-A such that its absorption axis was substantially perpendicular (90°±0.5°) to the long side of Liquid Crystal Cell B. At this time, the absorption axis of Polarizer P1 was substantially parallel to the initial alignment direction of Liquid Crystal Cell B. Polymer Film 2-A obtained in Reference Example 5 and serving as the second optical element was then attached via a pressure-sensitive acrylic adhesive layer (23 μm in thickness) to the viewer side surface of Liquid Crystal Cell B such that its slow axis was substantially parallel (0°±0.5°) to the long side of Liquid Crystal Cell B. Subsequently, Polar-were prepared using the process of Example 4 except that Polymer Film 1-B obtained in Reference Example 3 was used as the first optical element. Liquid Crystal Panel E was the O mode structure as shown in FIG. 5(b). Liquid Crystal Display E had good display uniformity over the entire face, immediately after the backlight was turned on. After the backlight was maintained on for 30 minutes, Liquid Crystal Display E was measured for the amount of color shift (Δxy) in oblique directions. The resulting properties are as shown in Table 5.

Example 6

A liquid crystal panel (named Liquid Crystal Panel F) and a liquid crystal display (named Liquid Crystal Display F) were prepared using the process of Example 4 except that Polymer Film 1-C obtained in Reference Example 4 was used as the first optical element and that the cellulose resin-containing polymer film side of Polymer Film 1-C was attached to Polarizer P1. Liquid Crystal Panel F was the O mode structure as shown in FIG. 5(b). Liquid Crystal Display F had good display uniformity over the entire face, immediately after the backlight was turned on. After the backlight was maintained on for 30 minutes, Liquid Crystal Display F was measured for the amount of color shift (Δxy) in oblique directions. The resulting properties are as shown in Table 5.

Comparative Example 3

A liquid crystal panel (named Liquid Crystal Panel J) and a liquid crystal display (named Liquid Crystal Display J) were prepared using the process of Example 4 except that Polymer Film 2-A obtained in Reference Example 5 was used as each of the first and second optical elements. Liquid Crystal Panel J was the O mode structure as shown in FIG. 7(b). Liquid Crystal Display J had good display uniformity over the entire face, immediately after the backlight was turned on. After the backlight was maintained on for 30 minutes, Liquid Crystal Display J was measured for the amount of color shift (Δxy) in oblique directions. The resulting properties are as shown in Table 5.

Comparative Example 4

A liquid crystal panel (named Liquid Crystal Panel K) and a liquid crystal display (named Liquid Crystal Display K) were prepared using the process of Example 4 except that Polymer Film 2-A obtained in Reference Example 5 was used as the first optical element and that Polymer Film 1-B obtained in Reference Example 3 was used as the second optical element. Liquid Crystal Panel K was the O mode structure as shown in FIG. 8(b). Liquid Crystal Display K had good display uniformity over the entire face, immediately after the backlight was turned on. After the backlight was maintained on for 30 minutes, Liquid Crystal Display K was measured for the amount of color shift (Δxy) in oblique directions. The resulting properties are as shown in Table 5.

INDUSTRIAL APPLICABILITY

As described above, the liquid crystal panel of the invention can reduce the amount of color shift in oblique directions and thus is very useful for the improvement of the display properties of liquid crystal displays. The liquid crystal panel of the invention is suitably used for liquid crystal displays and liquid crystal televisions.

What is claimed is:
1. A liquid crystal panel, comprising at least:
a liquid crystal cell having opposing sides comprising a liquid crystal layer containing a liquid crystal molecule that is oriented in homogeneous alignment with no electric field applied thereto;
a first polarizer placed on one side of the liquid crystal cell;
a first optical element placed directly between the liquid crystal cell and the first polarizer with no other optical element between the liquid crystal cell and the first polarizer; and
a second polarizer placed on the other side of the liquid crystal cell with no optical element placed between the liquid crystal cell and the second polarizer, wherein
the first optical element is substantially optically isotropic,
the liquid crystal cell has an initial alignment direction that is substantially parallel to the absorption axis of the first polarizer, and
the absorption axis of the first polarizer is substantially perpendicular to the absorption axis of the second polarizer;

TABLE 5

| | First Optical Element | | | Second Optical Element | | | Third Optical Element | | |
|---|---|---|---|---|---|---|---|---|---|
| | Polymer Film | Re [590] (nm) | Rth [590] (nm) | Polymer Film | Re [590] (nm) | Rth [590] (nm) | Liquid Crystal Panel | Structure | Δxy |
| Example 4 | 1-A | 2.0 | 8.2 | 2-A | 3.2 | 55.6 | D | FIG. 5(b) | 0.081 |
| Example 5 | 1-B | 1.0 | 3.1 | 2-A | 3.2 | 55.6 | E | FIG. 5(b) | 0.011 |
| Example 6 | 1-C | 0.1 | −5.0 | 2-A | 3.2 | 55.6 | F | FIG. 5(b) | 0.069 |
| Comparative Example 3 | 2-A | 3.2 | 55.6 | 2-A | 3.2 | 55.6 | J | FIG. 7(b) | 0.127 |
| Comparative Example 4 | 2-A | 3.2 | 55.6 | 1-B | 1.0 | 3.1 | K | FIG. 8(b) | 0.101 |

(Evaluations)

As described in each of Examples 1 to 6, the first optical element having substantially optically-isotropic properties was placed between the liquid crystal cell and the first polarizer placed on one side of the liquid crystal cell, and the first polarizer adjacent to the first optical element was placed such that its absorption axis was substantially parallel to the initial alignment direction of the liquid crystal cell, when a liquid crystal display was formed, so that a liquid crystal display with a small amount of color shift (Δxy) in oblique directions was obtained. In contrast, as described in each of Comparative Examples 1 to 4, the liquid crystal panel that did not satisfy the structure of the liquid crystal panel according to the invention only provided a liquid crystal display with a large amount of color shift (Δxy) in oblique directions.

wherein the first optical element satisfies the formulae:

$$Re[590] \leq 10 \text{ nm} \quad (1)$$

and $$|Rth[590]| \leq 10 \text{ nm} \quad (2)$$

wherein $Re[590]$ and $Rth[590]$ are an in-plane retardation and a thickness direction retardation, respectively, which are determined at 23° C. with respect to light having a wavelength of 590 nm.

2. The liquid crystal panel according to claim 1, wherein the first optical element comprises a polymer film that contains a cellulose resin or a norbornene resin.

3. The liquid crystal panel according to claim 1,
wherein the first optical element comprises a first retardation film and a second retardation film,
wherein the first retardation film satisfies the formulae:

$$Re[590] \leq 10 \text{ nm} \quad (3)$$

and $$10 \text{ nm} < Rth[590] \leq 200 \text{ nm} \quad (4),$$

and the second retardation film satisfies the formulae:

$$Re[590] \leq 10 \text{ nm} \quad (5)$$

and $$-200 \text{ nm} \leq Rth[590] < -10 \text{ nm} \quad (6),$$

wherein Re[590] and Rth[590] are an in-plane retardation and a thickness direction retardation, respectively, which are determined at 23° C. with respect to light having a wavelength of 590 nm.

4. The liquid crystal panel according to claim 3, wherein the second retardation film comprises a layer formed by solidifying or curing a composition that contains a homeotropically aligned liquid crystal compound.

5. The liquid crystal panel according to claim 1, wherein the first polarizer and the first optical element are placed on a viewer side of the liquid crystal cell.

6. The liquid crystal panel according to claim 5, wherein the second polarizer is placed on a backlight side of the liquid crystal cell such that the absorption axis of the second polarizer is perpendicular to the initial alignment direction of the liquid crystal cell.

7. The liquid crystal panel according to claim 1, wherein the first polarizer and the first optical element are placed on a backlight side of the liquid crystal cell.

8. The liquid crystal panel according to claim 7, wherein the first polarizer is placed on a backlight side of the liquid crystal cell such that the absorption axis of the first polarizer is parallel to the initial alignment direction of the liquid crystal cell.

9. The liquid crystal panel according to claim 1, wherein the liquid crystal cell is in IPS mode, FFS mode or FLC mode.

10. A liquid crystal television, comprising the liquid crystal panel according to claim 1.

11. A liquid crystal display, comprising the liquid crystal panel according to claim 1.

12. A liquid crystal panel, comprising:
a liquid crystal cell having opposing sides comprising a liquid crystal layer containing a liquid crystal molecule that is oriented in homogeneous alignment with no electric field applied thereto;
a first polarizer placed on one side of the liquid crystal cell;
a first optical element placed directly between the liquid crystal cell and the first polarizer with no other optical element between the liquid crystal cell and the first polarizer; and
a second polarizer placed on the other side of the liquid crystal cell
a second optical element placed directly between the liquid crystal cell and the second polarizer with no other optical element between the liquid crystal cell and the second polarizer, wherein the second optical element satisfies the formulae:

$$Re[590] \leq 10 \text{ nm} \quad (7)$$

and $$10 \text{ nm} < Rth[590] \leq 100 \text{ nm} \quad (8),$$

wherein Re[590] and Rth[590] are an in-plane retardation and a thickness direction retardation, respectively, which are determined at 23° C. with respect to light having a wavelength of 590 nm, wherein the first optical element is substantially optically isotropic, the liquid crystal cell has an initial alignment direction that is substantially parallel to the absorption axis of the first polarizer, and the absorption axis of the first polarizer is substantially perpendicular to the absorption axis of the second polarizer;

wherein the first optical element satisfies the formulae:
$Re[590] \leq 10$ nm (1) and $Rth[590] < 10$ nm (2) wherein Re[590] and Rth[590] are an in-plane retardation and a thickness direction retardation, respectively, which are determined at 23° C. with respect to light having a wavelength of 590 nm.

13. The liquid crystal panel according to claim 12, wherein the first polarizer and the first optical element are placed on a viewer side of the liquid crystal cell.

14. The liquid crystal panel according to claim 13, wherein the second polarizer is placed on a backlight side of the liquid crystal cell such that an absorption axis of the second polarizer is perpendicular to the initial alignment direction of the liquid crystal cell.

15. The liquid crystal panel according to claim 12, wherein the first polarizer and the first optical element are placed on a backlight side of the liquid crystal cell.

16. The liquid crystal panel according to claim 15, wherein the first polarizer is placed on a backlight side of the liquid crystal cell such that an absorption axis of the first polarizer is parallel to the initial alignment direction of the liquid crystal cell.

* * * * *